(12) United States Patent
Suga et al.

(10) Patent No.: US 11,213,992 B2
(45) Date of Patent: Jan. 4, 2022

(54) COMPOSITE PREFORM, METHOD FOR MANUFACTURING SAME, COMPOSITE CONTAINER, METHOD FOR MANUFACTURING SAID COMPOSITE CONTAINER, AND HEAT SHRINKABLE PLASTIC MEMBER

(71) Applicant: Dai Nippon Printing Co., Ltd., Tokyo (JP)

(72) Inventors: Yusuke Suga, Tokyo (JP); Takuma Miyawaki, Tokyo (JP); Kazuya Hirose, Tokyo (JP); Daichi Hashimoto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 271 days.

(21) Appl. No.: 16/310,564

(22) PCT Filed: Jun. 16, 2017

(86) PCT No.: PCT/JP2017/022419
§ 371 (c)(1),
(2) Date: Dec. 17, 2018

(87) PCT Pub. No.: WO2017/217550
PCT Pub. Date: Dec. 21, 2017

(65) Prior Publication Data
US 2019/0337217 A1   Nov. 7, 2019

(30) Foreign Application Priority Data

Jun. 17, 2016 (JP) .............................. JP2016-121027
Sep. 16, 2016 (JP) .............................. JP2016-181905

(Continued)

(51) Int. Cl.
*B32B 1/02* (2006.01)
*B29C 49/24* (2006.01)
(Continued)

(52) U.S. Cl.
CPC .............. *B29C 49/24* (2013.01); *B29C 43/02* (2013.01); *B29C 49/06* (2013.01); *B29C 49/221* (2013.01);
(Continued)

(58) Field of Classification Search
CPC .... B32B 1/02; B65D 1/0223; B65D 23/0878; Y10T 428/1352; B29B 2911/1408;
(Continued)

(56) References Cited

U.S. PATENT DOCUMENTS

2005/0051259 A1  3/2005  Luo
2016/0136864 A1  5/2016  Miyawaki et al.
2019/0337217 A1  11/2019  Suga et al.

FOREIGN PATENT DOCUMENTS

CA    2 969 016 A1   6/2016
CN    105263693 A    1/2016
(Continued)

OTHER PUBLICATIONS

Chinese Office Action (Application No. 201780037159.2) dated Aug. 17, 2020 (with English translation).
(Continued)

*Primary Examiner* — Walter Aughenbaugh
(74) *Attorney, Agent, or Firm* — Burr & Brown, PLLC

(57) ABSTRACT

A method for manufacturing a composite preform is provided, including preparing a preform that is formed from a plastic material, preparing a tubular heat shrinkable plastic member that is longer than the preform and has a margin for thermocompression bonding at one end, inserting the preform into the plastic member having the plastic member
(Continued)

undergo thermal shrinkage by heating the preform and the plastic member, and bonding the margin of the plastic member by thermocompression.

34 Claims, 20 Drawing Sheets

(30) Foreign Application Priority Data

| Jun. 1, 2017 | (JP) | ............................. JP2017-109297 |
| Jun. 1, 2017 | (JP) | ............................. JP2017-109490 |
| Jun. 14, 2017 | (JP) | ............................. JP2017-117022 |

(51) Int. Cl.

| *B29C 49/06* | (2006.01) |
| *B29C 49/22* | (2006.01) |
| *B65D 23/08* | (2006.01) |
| *B65D 1/02* | (2006.01) |
| *B29C 43/02* | (2006.01) |
| *B29K 67/00* | (2006.01) |
| *B29L 31/00* | (2006.01) |

(52) U.S. Cl.
CPC .............. *B32B 1/02* (2013.01); *B65D 1/0223* (2013.01); *B65D 23/0864* (2013.01); *B65D 23/0878* (2013.01); *B29B 2911/1408* (2013.01); *B29C 2049/225* (2013.01); *B29C 2049/2414* (2013.01); *B29K 2067/003* (2013.01); *B29K 2995/0049* (2013.01); *B29L 2031/7158* (2013.01); *Y10T 428/1352* (2015.01)

(58) Field of Classification Search
CPC ...... B29K 2067/003; B29K 2995/0049; B29L 2031/7158; B29C 43/02; B29C 49/06; B29C 49/24; B29C 49/221; B29C 2049/2414; B29C 2049/225
See application file for complete search history.

(56) References Cited

FOREIGN PATENT DOCUMENTS

| DE | 2 135 406 A1 | 2/1973 |
| EP | 3 015 245 A1 | 5/2016 |
| JP | S61-206623 A1 | 9/1986 |
| JP | S64-030729 A1 | 2/1989 |
| JP | 2000-158521 A1 | 6/2000 |
| JP | 2004-231280 A1 | 8/2004 |
| JP | 2008-233890 A1 | 10/2008 |
| JP | 2015-128858 A1 | 7/2015 |
| JP | 2016-097530 A1 | 5/2016 |
| JP | 2018-043483 A1 | 3/2018 |
| KR | 10-2016-0024840 A | 3/2016 |
| TW | 200510088 A | 3/2005 |
| WO | 2014/208746 A1 | 12/2014 |

OTHER PUBLICATIONS

Extended European Search Report (Application No. 17813443.3) dated Apr. 9, 2020.
International Search Report and Written Opinion (Application No. PCT/JP2017/022419) dated Sep. 12, 2017.
English translation of International Preliminary Report on Patentability (Chapter I) (Application No. PCT/JP2017/022419) dated Dec. 27, 2018, 6 pages.
Japanese Office Action (Application No. 2017-109490) dated Mar. 12, 2021 (with English translation).
Chinese Office Action (Application No. 201780037159.2) dated Mar. 19, 2021 (with English translation).
Korean Office Action (Application No. 10-2019-7001202) dated Feb. 22, 2021 (with English translation).
Japanese Office Action (Application No. 2020-206154) dated Oct. 15, 2021 (with English translation).

COMPOSITE PREFORM, METHOD FOR MANUFACTURING SAME, COMPOSITE CONTAINER, METHOD FOR MANUFACTURING SAID COMPOSITE CONTAINER, AND HEAT SHRINKABLE PLASTIC MEMBER

FIELD OF THE INVENTION

The present invention relates to a composite preform, a method for manufacturing the same, a composite container, a method for manufacturing the composite container, and a heat shrinkable plastic member.

BACKGROUND OF THE INVENTION

Nowadays, plastic bottles are widely used as bottles accommodating content liquids such as foods and beverages, and such plastic bottles accommodate content liquids.

A plastic bottle accommodating such content liquids is manufactured by a preform being inserted into a mold and biaxial stretch blow molding being performed.

In the conventional biaxial stretch blow molding method, molding into a container shape is performed by means of a preform including, for example, a single layer material such as PET or PP, a multilayer material, or a blended material. In the conventional biaxial stretch blow molding method, it is common to simply mold a preform into a container shape. Accordingly, means for imparting various functions and characteristics (such as barrier properties and heat retention properties) to a container is limited, examples of which include a change in preform-constituting material. In particular, it is difficult to have different functions and characteristics depending on container parts (such as body and bottom portions).

In order to solve the above problems, the inventors of the present invention have proposed a composite container provided with various functions and characteristics such as light shielding properties, a composite preform used for composite container production, and methods for manufacturing the composite container and the composite preform (see WO2014/208746A). When such composite containers are manufactured, a heat shrinkable plastic member can be used as a plastic member. When the heat shrinkable plastic member is used, the appearance and the light shielding properties of especially the bottom portion of a composite container need to be improved.

In addition, the present applicant has proposed a composite container capable of imparting various functions and characteristics to a container in an earlier application (JP2015-128858A).

CITATION LIST

Patent Literature

Patent Literature 1: JP2015-128858A
Patent Literature 2: WO2014/208746A

The composite container that is disclosed in JP2015-128858A is obtained by blow molding of a composite preform provided with a container main body and a plastic member. Although it is preferable that the plastic member of the composite preform is heat shrinkable from the viewpoint of close contactability with respect to a preform, eventually the container main body, it was found that the bottom portion of the preform (container main body) is not completely covered with ease and it is difficult to impart various functions such as enhancement of the light shielding properties of the bottom portion.

The present invention has been made based on this finding, and an object of the present invention is to provide a method for manufacturing a composite preform provided with a heat shrinkable plastic member capable of covering the bottom portion of a preform and free from breakage attributable to blow molding during composite container production.

The inventors of the present invention found that the composite preform provided with the heat shrinkable plastic member capable of covering the bottom portion of a preform and free from breakage attributable to blow molding during composite container production can be derived from thermocompression bonding of one end of the plastic member of the composite preform. Further, the inventors of the present invention found that bubble generation can be prevented and the post-blow molding close contactability of the plastic member with respect to a container main body and the appearance thereof can be improved by the thermocompression bonding being performed along the shape of the bottom portion of the preform. The present invention is based on this finding.

The present invention has been made in view of the above background art, and an object of the present invention is to provide a composite preform causing no bubble generation between a plastic member and a container main body during blow molding or the like and allowing production of a composite container provided with the plastic member capable of covering the bottom portion of the container main body and free from breakage even in the event of blow molding.

The inventors of the present invention found that it is possible to manufacture the composite container in which the bottom portion of the container main body is completely covered by the plastic member by thermocompression bonding and subsequent twisting of one end of a preform-inserted heat shrinkable plastic member. Further, the inventors of the present invention found that a composite container obtained by a method including the twisting step is capable of effectively preventing bubble generation between a container main body and a plastic member attributable to blow molding and capable of preventing breakage such as peeling of a thermocompression bonding portion during blow molding as compared with a composite container obtained by a method including no twisting step and including only a thermocompression bonding step.

Accordingly, an object of the present invention is to provide a composite preform production method that is used for manufacturing a composite container provided with a container main body and a plastic member capable of completely covering the bottom portion of the container main body and is capable of preventing breakage of a thermocompression bonding portion and bubble generation between the container main body and the plastic member attributable to blow molding.

Further, the present invention is to provide a composite preform, a method for manufacturing the same, a composite container, a method for manufacturing the composite container, and a heat shrinkable plastic member allowing a decent appearance especially in the bottom portion of the composite container.

SUMMARY OF THE INVENTION

A method for manufacturing a composite preform according to the present invention includes: preparing a preform formed from a plastic material and having a mouth portion, a body portion connected to the mouth portion, and a bottom portion connected to the body portion; preparing a tubular heat shrinkable plastic member longer than the body portion and the bottom portion of the preform and having a margin for thermocompression bonding at one end; inserting the preform into the plastic member; having the plastic member undergo thermal shrinkage by heating the preform and the plastic member; and bonding the margin of the plastic member by thermocompression.

In the aspect described above, preferably, a first facing surface and a second facing surface disposed so as to face each other are formed at the margin and a part of the first facing surface and a part of the second facing surface are compression-bonded to each other.

In the aspect described above, the first facing surface and the second facing surface are preferably compression-bonded in mutual misalignment in an axial direction of the plastic member.

In the aspect described above, the margin preferably has a length of 3 mm or more.

In the aspect described above, the thermocompression bonding of the margin is preferably performed by means of an instrument having a flat or uneven surface.

In the aspect described above, the instrument preferably has a surface temperature of 100° C. or more and 250° C. or less.

In the aspect described above, a pressure during the thermocompression bonding of the margin is preferably 50 N/cm$^2$ or more and 1,000 N/cm$^2$ or less.

In the aspect described above, the heat shrinkable plastic member preferably has a temperature of 80° C. or more and 200° C. or less during the thermocompression bonding of the margin.

A method for manufacturing a composite container according to the present invention includes: heating a composite preform obtained by the method and inserting the composite preform into a blow molding mold; and integrally expanding a preform and a plastic member by applying blow molding to the composite preform after the heating.

A composite preform according to the present invention includes: a preform having a mouth portion, a body portion connected to the mouth portion, and a bottom portion connected to the body portion; and a heat shrinkable plastic member longer than the body portion and the bottom portion of the preform, having a margin for thermocompression bonding at one end, and provided so as to surround an outside of the preform, wherein the margin of the plastic member is bonded by thermocompression.

In the aspect described above, preferably, a first facing surface and a second facing surface disposed so as to face each other are formed at the margin and a part of the first facing surface and a part of the second facing surface are compression-bonded to each other.

In the aspect described above, the first facing surface and the second facing surface are preferably compression-bonded in mutual misalignment in an axial direction of the plastic member.

A composite container according to the present invention is a composite container as a blow molded article of the composite preform includes: a container main body having a mouth portion, a body portion provided below the mouth portion, and a bottom portion provided below the body portion; and a heat shrinkable plastic member provided in close contact with an outside of the container main body, wherein the margin of the plastic member is bonded by thermocompression.

According to the present invention, it is possible to provide a method for manufacturing a composite preform provided with a heat shrinkable plastic member capable of covering the bottom portion of a preform and free from breakage attributable to blow molding during composite container production.

A composite preform according to the present invention includes: a preform having a mouth portion, a body portion connected to the mouth portion, and a bottom portion connected to the body portion; and a heat shrinkable plastic member provided so as to surround an outside of the preform, wherein an end portion of the plastic member on the bottom portion side of the preform forms a compression bonding bottom portion by being compression-bonded along a shape of the bottom portion of the preform.

A composite container according to the present invention is a blow molded article of the composite preform includes: a container main body having a mouth portion, a body portion provided below the mouth portion, and a bottom portion provided below the body portion; and a heat shrinkable plastic member provided in close contact with an outside of the container main body, wherein one end of the plastic member on the bottom portion side of the container main body forms a compression bonding bottom portion by being compression-bonded.

A method for manufacturing a composite preform according to the present invention includes: preparing a preform having a mouth portion, a body portion connected to the mouth portion, and a bottom portion connected to the body portion; preparing a tubular heat shrinkable plastic member longer than the body portion and the bottom portion of the preform; inserting the preform into the plastic member; having the plastic member undergo thermal shrinkage by heating the preform and the plastic member; and forming a compression bonding bottom portion by performing thermocompression bonding on an end portion of the plastic member on the bottom portion side of the preform along a shape of the bottom portion of the preform.

In the aspect described above, the thermocompression bonding is preferably performed by means of an instrument having a flat or uneven surface.

In the aspect described above, the instrument has preferably a surface temperature of 100° C. or more and 250° C. or less.

In the aspect described above, a pressure during the thermocompression bonding is preferably 50 N/cm$^2$ or more and 1,000 N/cm$^2$ or less.

In the aspect described above, the heat shrinkable plastic member preferably has a temperature of 80° C. or more and 200° C. or less during the thermocompression bonding.

In the aspect described above, the method for manufacturing a composite preform preferably further includes performing cutting such that a length from a vertex of the bottom portion of the preform to an endmost part of the plastic member is 0.5 mm or more and 5 mm or less.

In the aspect described above, a length of the plastic member preferably exceeds a sum of lengths of the body portion and the bottom portion of the preform by 3 mm or more and 25 mm or less.

According to the present invention, it is possible to provide a composite preform and a method for manufacturing the composite preform causing no bubble generation between a plastic member and a container main body during blow molding or the like and allowing production of a composite container provided with the plastic member capable of covering the bottom portion of the container main body and free from breakage even in the event of blow molding.

In addition, it is possible to provide a composite container that can be manufactured by blow molding of the composite preform.

A method for manufacturing a composite preform according to the present invention includes: preparing a preform having a mouth portion, a body portion connected to the mouth portion, and a bottom portion connected to the body portion; preparing a tubular heat shrinkable plastic member having a margin for thermocompression bonding at one end; inserting the preform into the plastic member; having the plastic member undergo thermal shrinkage by heating the plastic member; bonding the margin of the plastic member by thermocompression; and forming a twist portion by twisting the margin bonded by the thermocompression.

In the aspect described above, the thermocompression bonding of the margin is preferably performed by means of an instrument having a flat or uneven surface.

In the aspect described above, the instrument preferably has a surface temperature of 100° C. or more and 250° C. or less.

In the aspect described above, a pressure during the thermocompression bonding of the margin is preferably 50 N/cm$^2$ or more and 1,000 N/cm$^2$ or less.

In the aspect described above, the heat shrinkable plastic member preferably has a temperature of 80° C. or more and 200° C. or less during the thermocompression bonding of the margin.

In the aspect described above, the twist portion forming is preferably performed such that the margin bonded by thermocompression is twisted off.

In the aspect described above, the bonding the margin by thermocompression and the twist portion forming are preferably simultaneously performed.

In the aspect described above, the margin preferably has a length of 3 mm or more.

A method for manufacturing a composite container according to the present invention includes: heating a composite preform and inserting the composite preform into a blow molding mold; and integrally expanding a preform and a plastic member by applying blow molding to the composite preform after the heating.

A composite preform according to the present invention includes: a preform having a mouth portion, a body portion connected to the mouth portion, and a bottom portion connected to the body portion; and a heat shrinkable plastic member having a margin for thermocompression bonding at one end and provided so as to surround an outside of the preform, wherein a twist portion is formed by the margin of the plastic member being bonded by thermocompression and twisted.

A composite container according to the present invention is a composite container as a blow molded article of the composite preform includes: a container main body having a mouth portion, a body portion provided below the mouth portion, and a bottom portion provided below the body portion; and a heat shrinkable plastic member provided in close contact with an outside of the container main body.

According to the method of the present invention, it is possible to provide a composite preform allowing production of a composite container provided with a container main body and a plastic member capable of completely covering the bottom portion of the container main body.

In addition, a composite container obtained by means of the composite preform is capable of preventing bubbles from entering the space between the container main body and the plastic member as a result of blow molding and capable of preventing a margin bonded by thermocompression from being broken as a result of blow molding.

The present invention is a method for manufacturing a composite preform including: preparing a preform formed from a plastic material and having a mouth portion, a body portion, and a bottom portion; preparing a tubular heat shrinkable plastic member having one end and the other end, with a first notch portion and a second notch portion respectively formed at positions facing each other at the one end; loosely inserting the heat shrinkable plastic member into the preform from the other end side; and bringing the heat shrinkable plastic member into close contact with an outside of the preform by having the heat shrinkable plastic member undergo thermal shrinkage.

The present invention is a method for manufacturing a composite preform including: preparing a preform formed from a plastic material and having a mouth portion, a body portion, and a bottom portion; preparing a heat shrinkable plastic member; loosely inserting the heat shrinkable plastic member into the preform; bringing the heat shrinkable plastic member into close contact with an outside of the preform by having the heat shrinkable plastic member undergo thermal shrinkage; and forming a first notch portion and a second notch portion respectively at positions facing each other at one end on an open side of the heat shrinkable plastic member.

The present invention is the method for manufacturing a composite preform, a first piece and a second piece separated from each other by the first notch portion and the second notch portion are formed at the one end of the heat shrinkable plastic member, and compression-bonding a part of the first piece and a part of the second piece to each other is provided after the having the heat shrinkable plastic member undergo thermal shrinkage.

In the aspect described above, the compression bonding preferably is performed by means of an instrument having a flat or uneven surface.

In the aspect described above, the instrument has preferably a surface temperature of 100° C. or more and 250° C. or less.

In the aspect described above, a pressure during the compression bonding is preferably 50 N/cm$^2$ or more and 1,000 N/cm$^2$ or less.

In the aspect described above, the heat shrinkable plastic member has preferably a temperature of 80° C. or more and 200° C. or less during the compression bonding.

The present invention is a method for manufacturing a composite container including: manufacturing a composite preform by the composite preform production method; and integrally expanding the preform and the heat shrinkable plastic member by applying blow molding to the heat shrinkable plastic member and the preform of the composite preform.

The present invention is a composite preform including: a preform formed from a plastic material and having a mouth portion, a body portion, and a bottom portion; and a tubular heat shrinkable plastic member provided so as to surround an outside of the preform, wherein the heat shrinkable plastic member has a tubular large diameter portion covering at least the body portion of the preform and a diameter reduced portion extending outwards from the bottom portion of the preform, and a first notch portion and a second notch portion are respectively formed at positions facing each other in the diameter reduced portion.

The present invention is the composite preform, a first piece and a second piece separated from each other by the first notch portion and the second notch portion are formed in the diameter reduced portion and a part of the first piece and a part of the second piece are compression-bonded to each other.

The present invention is a composite container as a blow molded article of the composite preform includes: a container main body having a mouth portion, a body portion, and a bottom portion; and a heat shrinkable plastic member provided in close contact with an outside of the container main body, wherein the heat shrinkable plastic member is compression-bonded at a position covering the bottom portion of the container main body.

The present invention is a heat shrinkable plastic member mounted so as to surround an outside of a preform, including a tubular main body portion having one end and the other end, wherein a first notch portion and a second notch portion are respectively formed at positions facing each other at the one end.

According to the present invention, a decent appearance can be achieved especially in the bottom portion of a composite container and a region that has light shielding properties can be spread up to the bottom portion.

DETAILED DESCRIPTION OF THE INVENTION

First Embodiment

Hereinafter, a first embodiment of the present invention will be described with reference to accompanying drawings. FIGS. 1 to 10 are diagrams illustrating the first embodiment of the present invention.

Composite Preform 70

First, the configuration of a composite preform according to the present embodiment will be described with reference to FIGS. 1 and 2.

Figure 1:
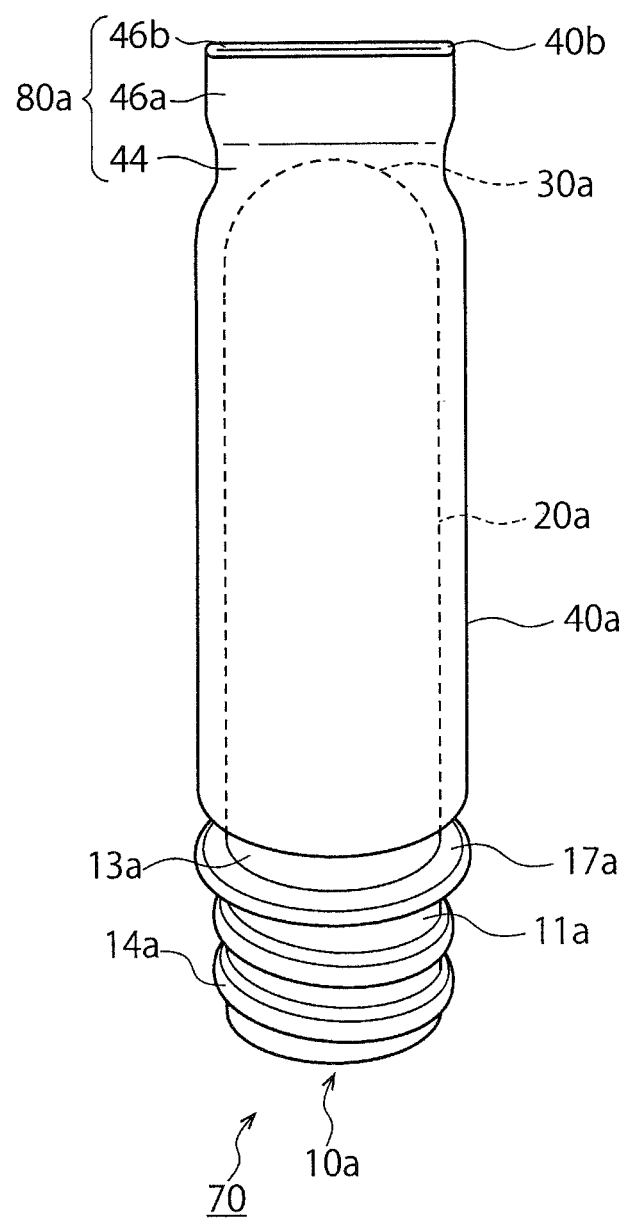
FIG. 1 is a perspective view illustrating a composite preform according to a first embodiment of the present invention.
Figure 2:
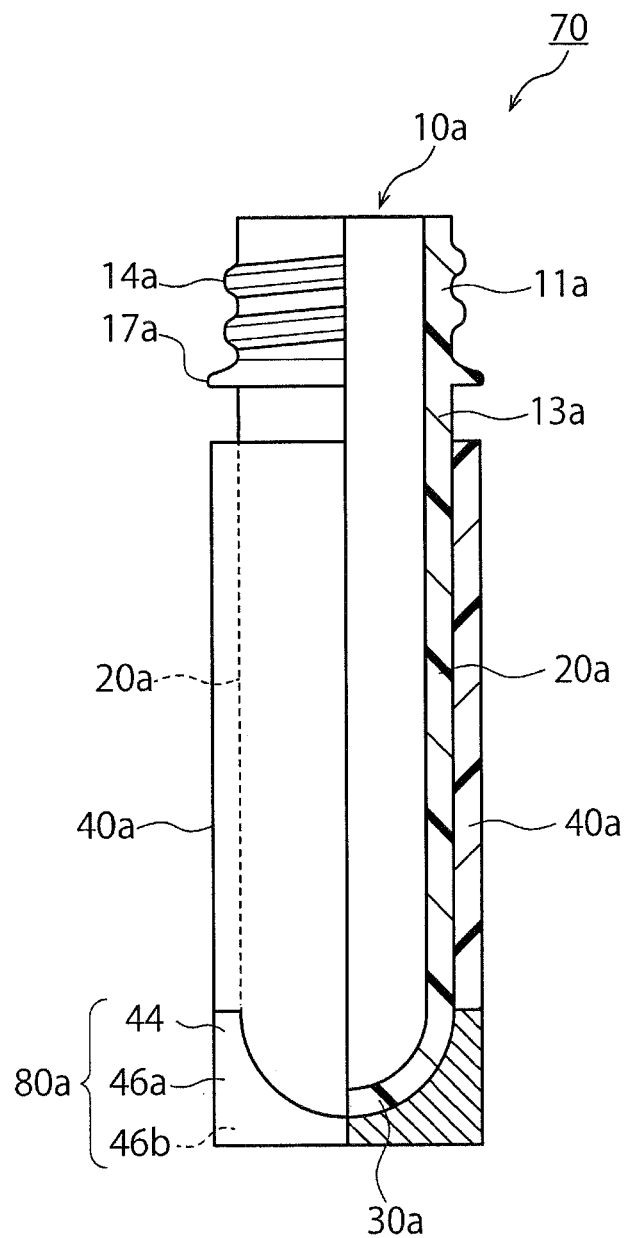
FIG. 2 is a partial vertical cross-sectional view illustrating the composite preform according to the first embodiment of the present invention.

As illustrated in FIGS. 1 and 2, a composite preform 70 according to the present embodiment is provided with a preform 10a formed from a plastic material and a heat shrinkable plastic member 40a, which has a substantially bottomed cylindrical shape and is provided so as to surround the outside of the preform 10a.

As illustrated in FIGS. 1 and 2, the preform 10a is provided with a mouth portion 11a, a body portion 20a connected to the mouth portion 11a, and a bottom portion 30a connected to the body portion 20a.

In this case, the length of the heat shrinkable plastic member 40a is longer than the lengths of the body portion and the bottom portion of the preform 10a. As indicated by hatching in FIG. 2, a margin 80a for thermocompression bonding is formed in an end portion (one end) 40b of the plastic member 40a, which is on the bottom portion 30a side of the preform 10a.

The margin 80a has a curved surface portion 44 formed along the shape of the bottom portion 30a of the preform 10a and a first facing surface 46a and a second facing surface 46b respectively protruding from the curved surface portion 44. The first facing surface 46a and the second facing surface 46b are bonded and integrated with each other by thermocompression. Each of the first facing surface 46a and the second facing surface 46b extends substantially in a straight line along the radial direction of the body portion 20a when viewed from the bottom surface direction. In this case, the first facing surface 46a and the second facing surface 46b are compression-bonded over the entire region in the radial direction of the body portion 20a.

Figure 3:
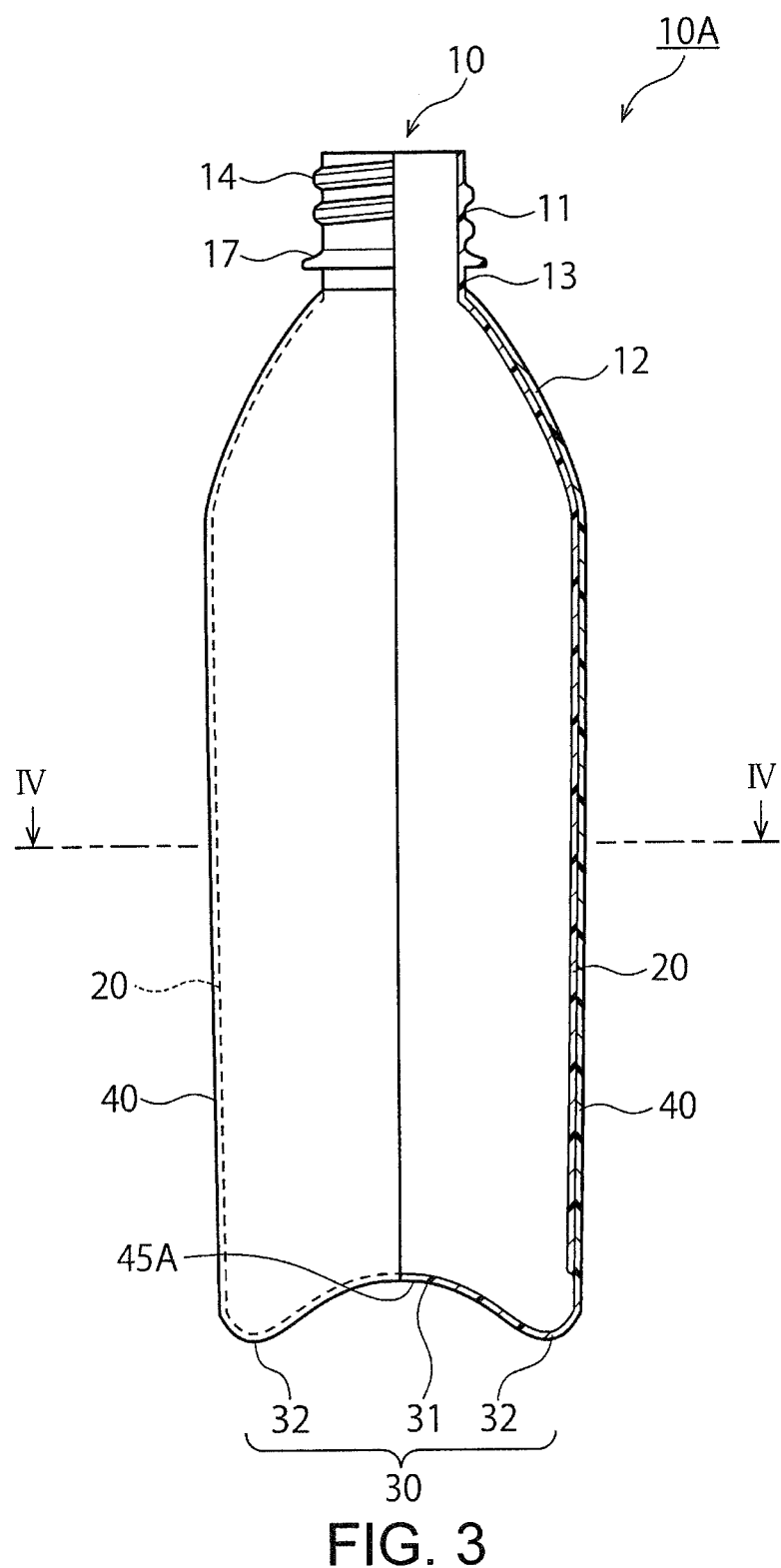
FIG. 3 is a partial vertical cross-sectional view illustrating a composite container according to the first embodiment of the present invention.

A composite container 10A illustrated in FIG. 3 can be obtained by biaxial stretch blow molding being performed on the composite preform 70 and the plastic member 40a and the preform 10a of the composite preform 70 being integrally expanded.

Composite Container

Next, the configuration of the composite container 10A according to the present embodiment will be described. As illustrated in FIG. 3, the composite container 10A is provided with a container main body 10 formed from a plastic material and positioned inside and a plastic member 40 provided in close contact with the outside of the container main body 10. As will be described later, the composite container 10A is obtained by the heat shrinkable plastic member 40a and the preform 10a of the composite preform 70 being integrally expanded by biaxial stretch blow molding being performed on the composite preform 70 by means of a blow molding mold 50.

The container main body 10 is provided with a mouth portion 11, a neck portion 13 provided below the mouth portion 11, a shoulder portion 12 provided below the neck portion 13, a body portion 20 provided below the shoulder portion 12, and a bottom portion 30 provided below the body portion 20. In this specification, "upper" and "lower" refer to the upper side and the lower side in the upright state of the composite container 10A (FIG. 3), respectively.

The mouth portion 11 has a screw portion 14 screwed into a cap (not illustrated) and a flange portion 17 provided below the screw portion 14. The shape of the mouth portion 11 may be a conventionally known shape or the mouth portion 11 may be a stopper-type mouth portion or the like.

The neck portion 13 is positioned between the flange portion 17 and the shoulder portion 12 and has a substantially cylindrical shape having a substantially uniform diameter. The shoulder portion 12 is positioned between the neck portion 13 and the body portion 20 and is shaped so as to have a diameter gradually increasing from the neck portion 13 side toward the body portion 20 side.

The body portion 20 has a cylindrical shape having a substantially uniform diameter as a whole. However, the present invention is not limited thereto, and the body portion 20 may have a polygonal tubular shape such as a quadrangular tubular shape and an octagonal tubular shape. Alternatively, the body portion 20 may have a tubular shape having a horizontal cross section that is not uniform from the top to the bottom. Although the body portion 20 has no unevenness and has a substantially flat surface in the present embodiment, the present invention is not limited thereto. For example, the body portion 20 may have an uneven part such as a panel and a groove.

The bottom portion 30 has a recessed portion 31 positioned in the middle and a ground portion 32 provided around the recessed portion 31. The shape of the bottom portion 30 is not particularly limited, and the bottom portion 30 may have a conventionally known bottom portion shape (such as a petaloid bottom shape and a round bottom shape).

Although the thickness of the container main body 10 in the body portion 20 is not limited thereto, the thickness can be reduced to, for example, approximately 50 μm or more and 250 μm or less. Although the weight of the container main body 10 is not limited thereto, the weight can be, for example, 10 g or more and 20 g or less in a case where the container main body 10 has an internal capacity of 500 ml. By reducing the wall thickness of the container main body 10 in this manner, it is possible to reduce the weight of the container main body 10.

The container main body 10 can be manufactured by biaxial stretch blow molding being performed on the preform 10a manufactured by injection molding of a resin material.

A vapor deposited layer such as a diamond-shaped carbon layer and a silicon oxide thin layer may be formed on the inner surface of the container main body 10 so that the barrier properties of the container are enhanced.

The container main body 10 may be made of, for example, a bottle having a full filling capacity of 100 ml or more and 2,000 ml or less. Alternatively, the container main body 10 may be a large bottle having a full filling capacity of, for example, 10 L or more and 60 L or less.

Figure 4:
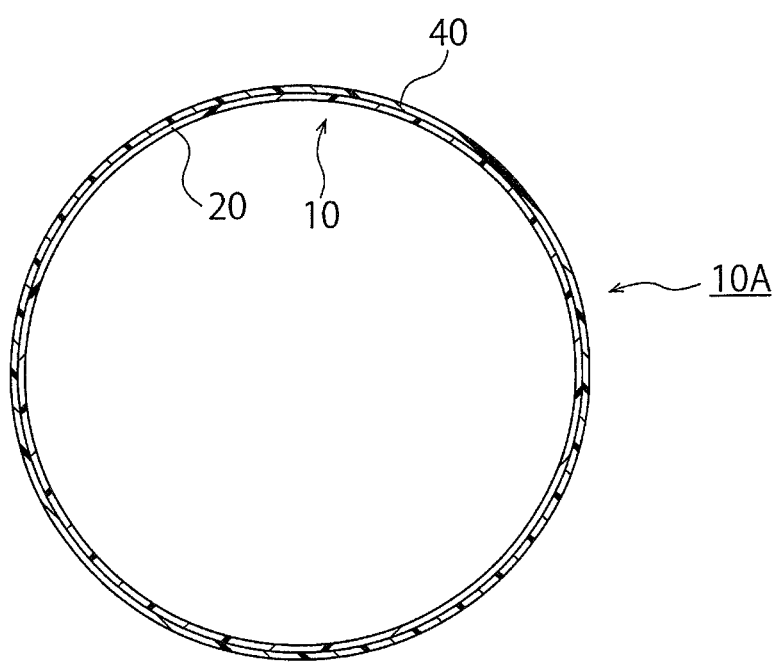
FIG. 4 is a horizontal cross-sectional view taken along line IV-IV of the composite container illustrated in FIG. 3.
Figure 5:
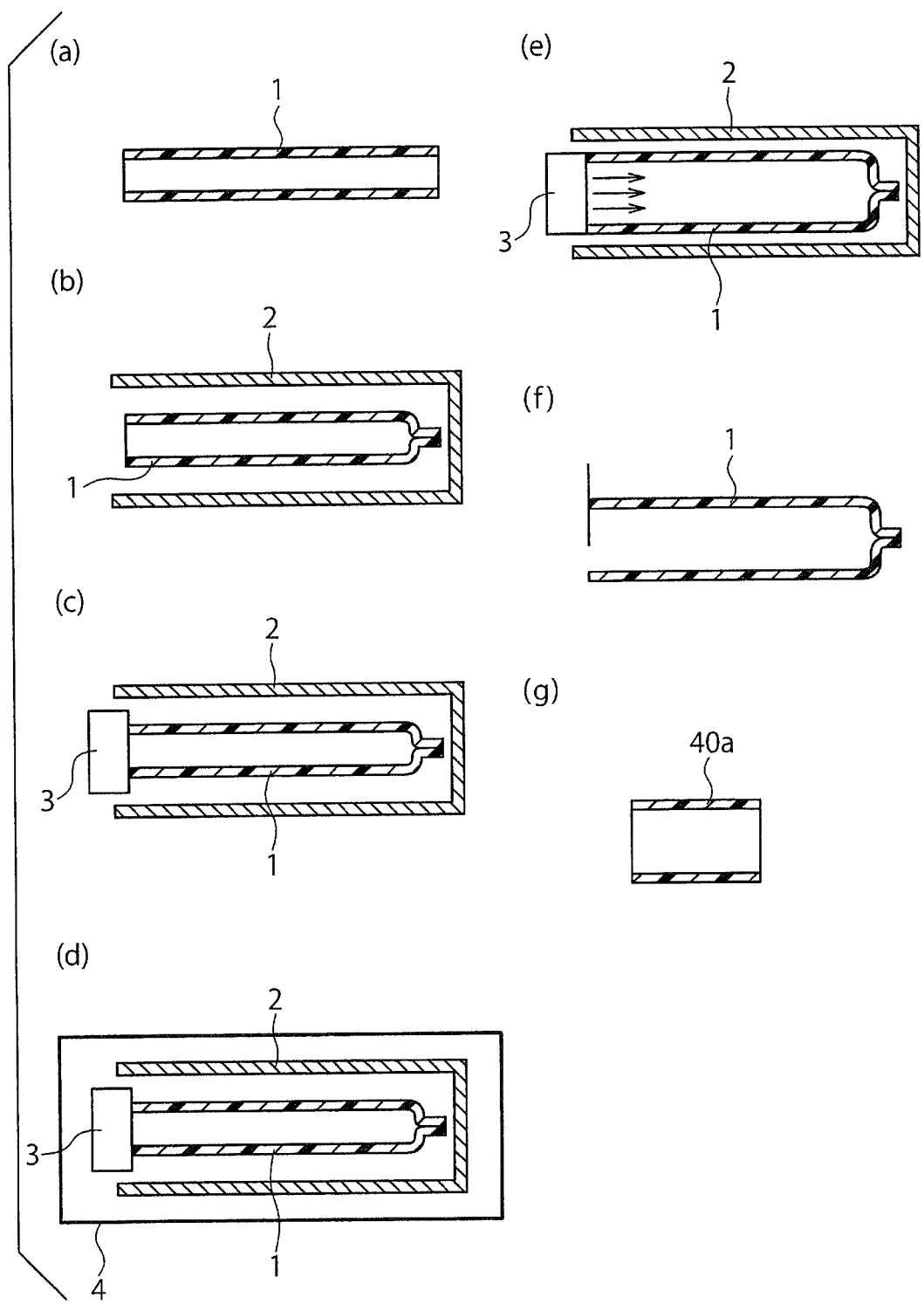
FIG. 5 is a schematic diagram illustrating one embodiment of a method for manufacturing a heat shrinkable plastic member.

The heat shrinkable plastic member 40 is attached, without adhesion, to the outer surface of the container main body 10. The heat shrinkable plastic member 40 is brought into close contact with the outer surface of the container main body 10 in a thinly extended state and is attached to the container main body 10 in a state of not moving or rotating with ease. As illustrated in FIG. 4, the heat shrinkable plastic member 40 is provided over the entire circumferential region of the container main body 10 so as to surround the container main body 10 and has a substantially circular horizontal cross section.

The plastic member 40 (40a) is obtained by the plastic member 40 (40a) being provided so as to surround the outside of the preform 10a as will be described later, the plastic member 40 (40a) being brought into close contact with the outside of the preform 10a, and then biaxial stretch blow molding being performed on the plastic member 40 (40a) and the preform 10a. As will be described later, the heat shrinkable plastic member 40 is manufactured by the tubular heat shrinkable plastic member 40a and the preform 10a being integrally stretched.

As illustrated in FIG. 3, the plastic member 40 can be provided so as to cover the shoulder portion 12, the body portion 20, and the bottom portion 30 of the container main body 10 except for the mouth portion 11 and the neck portion 13. With this configuration, it is possible to impart desired functions and characteristics to the shoulder portion 12, the body portion 20, and the bottom portion 30 of the container main body 10. The plastic member 40 may be provided so as to cover the neck portion 13, the shoulder portion 12, the body portion 20, and the bottom portion 30 of the container main body 10 except for the mouth portion 11.

Although the thickness of the heat shrinkable plastic member 40 is not limited thereto, the thickness can be, for example, 5 μm or more and 500 μm or less, more preferably approximately 5 μm or more and 50 μm or less, in a state of being attached to the container main body 10.

In the present embodiment, the heat shrinkable plastic member 40 may be colored in a visible light color such as red, blue, yellow, green, brown, black, and white. In addition, the heat shrinkable plastic member 40 may be transparent (semitransparent) or opaque. In this case, for example, the heat shrinkable plastic member 40 may be colored in a visible light color with the container main body 10 colorless and transparent. Alternatively, both the container main body 10 and the heat shrinkable plastic member 40 may be colored in a visible light color. In a case where the heat shrinkable plastic member 40 that is colored in a visible light color is manufactured, a pigment having the visible light color may be added to a molding material in a step for manufacturing the heat shrinkable plastic member 40a before blow molding by extrusion molding or the like.

The heat shrinkable plastic member 40 is not welded or adhered to the container main body 10, and thus can be separated (peeled) and removed from the container main body 10. The heat shrinkable plastic member 40 can be separated (peeled) from the container main body 10 by, for example, being cut out by means of a knife or the like or peeled along a cutting line or a notch provided in advance in the heat shrinkable plastic member 40. By those methods, the heat shrinkable plastic member 40 can be separated and removed from the container main body 10, and thus it is possible to recycle the container main body 10 that is colorless and transparent as in conventional cases.

As illustrated in FIG. 3, one end of the heat shrinkable plastic member 40 that is on the bottom portion 30 side of the container main body 10 is compression-bonded to form a compression bonding bottom portion 45A. In FIG. 3, the heat shrinkable plastic member 40 is compression-bonded at a position covering the bottom portion 30 of the container main body 10. Specifically, the first facing surface 46a and the second facing surface 46b (FIG. 1) of the heat shrinkable plastic member 40a of the composite preform 70 described above are bonded by thermocompression so as to be overlapped with each other. As a result, an opening 48d (FIG. 6) of the heat shrinkable plastic member 40a is blocked after blow molding, and the bottom portion 30 is completely covered by the heat shrinkable plastic member 40.

Method for Manufacturing Composite Preform

Next, a method for manufacturing the composite preform 70 according to the present embodiment will be described.

Step for Preparing Preform

First, the preform 10a is prepared. As illustrated in FIGS. 1 and 2, the preform 10a is provided with the mouth portion 11a, the body portion 20a connected to the mouth portion 11a, and the bottom portion 30a connected to the body portion 20a. The mouth portion 11a corresponds to the mouth portion 11 of the container main body 10 described above and has substantially the same shape as the mouth portion 11. The mouth portion 11a has a screw portion 14a screwed into a cap (not illustrated) after the composite container 10A is manufactured and a flange portion 17a provided below the screw portion 14a. The body portion 20a corresponds to the neck portion 13, the shoulder portion 12, and the body portion 20 of the container main body 10 described above and has a substantially cylindrical shape. The bottom portion 30a corresponds to the bottom portion 30 of the container main body 10 described above and has a substantially hemispherical shape.

The preform 10a can be manufactured by a resin material being injection-molded by means of a conventionally known apparatus. Preferably, a thermoplastic resin is used as the resin material. Especially preferable are polyethylene (PE), polypropylene (PP), polyethylene terephthalate (PET), polyethylene naphthalate (PEN), polycarbonate (PC), and ionomer resin. In addition, the above-mentioned various resins may be blended and used. Although the preform 10a may contain a coloring agent such as red, blue, yellow, green, brown, black, and white, it is preferable that the preform 10a contains no coloring agent and is colorless and transparent in view of the ease of recycling.

By the multilayer preform 10a that has two or more layers being manufactured by injection molding, the container main body 10 can be a multilayer molded bottle having two or more layers. For example, a multilayer molded bottle having gas barrier properties, light shielding properties, and the like can be obtained once blow molding is performed after molding of the preform 10a that has the three or more layers including an intermediate layer containing a resin (intermediate layer) having gas barrier properties and light shielding properties such as MXD 6, MXD 6+fatty acid salt, poly glycolic acid (PGA), ethylene vinyl alcohol copolymer (EVOH), and polyethylene naphthalate (PEN). A resin obtained by blending of the above-mentioned various resins or the like may be used as the intermediate layer.

A foamed preform having a foam cell diameter of 0.5 μm or more and 100 μm or less may be molded by mixing of an inert gas (nitrogen gas, argon gas) with a molten thermoplastic resin material so that the container main body 10 is manufactured by blow molding of the foamed preform. The container main body 10 incorporates a foam cell, and thus the light shielding properties of the entire container main body 10 can be enhanced.

Step for Preparing Tubular Heat Shrinkable Plastic Member

First, the heat shrinkable plastic member 40a is prepared. In one embodiment, the tubular heat shrinkable plastic member 40a can be manufactured by a method including an extrusion molding step.

More specifically, first, a resin material or the like to be described later is heated and melted in an extrusion device, the melted resin material or the like is continuously extruded from a ring die and cooled, and then the resin material or the like is molded into an unstretched extrusion tube 1 (see FIG. 5(a)). The plastic member 40a that has multiple layers can be manufactured by co-extrusion of two or more resin materials.

Next, one end of the extrusion tube is closed by welding or adhesion of the one end of the unstretched extrusion tube.

After the one end is closed, the extrusion tube 1 is disposed in a mold 2 having an inner diameter larger than the outer diameter of the extrusion tube 1 (see FIG. 5(b)).

Next, a blow device 3 is disposed (mounted) at the other end of the extrusion tube 1 (see FIG. 5(c)). At this time, it is preferable that the blow device 3 is brought into close contact with the extrusion tube 1 such that air does not leak from the space between the blow device 3 and the extrusion tube 1.

Subsequently, the extrusion tube 1, the mold 2, and the blow device 3 are fed into a heating furnace 4 in this disposition and heated to 70 to 150° C. inside the heating furnace 4 (see FIG. 5(d)). A hot air circulation-type heating furnace may be used as the heating furnace 4 so that the temperature inside the furnace is uniform. Alternatively, the extrusion tube 1, the mold 2, and the blow device 3 may be heated by being passed through a heated liquid.

Next, the extrusion tube 1, the mold 2, and the blow device 3 are taken out from the heating furnace 4 and air is ejected from the blow device 3 into the extrusion tube 1. Then, the inner surface of the extrusion tube 1 is rolled and stretched. As a result, the extrusion tube 1 expands and is enlarged in diameter along the inner surface shape of the mold 2 (see FIG. 5(e)).

Subsequently, the extrusion tube 1 is cooled in cold water with air ejected from the blow device 3, and the extrusion tube is taken out from the mold 2 (see FIG. 5(f)). The tubular heat shrinkable plastic member 40a is obtained once the tube is cut into a desired size (see FIG. 5(g)). A commercially available tubular heat shrinkable plastic member 40a may be used.

The heat shrinkable plastic member 40a is capable of containing a resin material such as polyethylene, polypropylene, polyethylene terephthalate, polyethylene naphthalate, poly-4-methylpentene-1, polystyrene, AS resin, ABS resin, polyvinyl chloride, polyvinylidene chloride, polyvinyl acetate, polyvinyl alcohol, polyvinyl acetal, polyvinyl butyral, ionomer resin, diallyl phthalate resin, fluoro-based resin, polymethyl methacrylate, polyacrylic acid, polyacrylic acid methyl, polyacrylonitrile, polyacrylamide, polybutadiene, polybutene-1, polyisoprene, polychloroprene, ethylene propylene rubber, butyl rubber, nitrile rubber, acrylic rubber, silicone rubber, fluoro rubber, nylon 6, nylon 6,6, MXD 6, aromatic polyamide, polycarbonate, butylene polyterephthalate, U polymer, liquid crystal polymer, modified polyphenylene ether, polyether ketone, polyether ether ketone, unsaturated polyester, alkyd resin, polyimide, polysulfone, polyphenylene sulfide, polyethersulfone, silicone resin, polyurethane, phenol resin, urea resin, polyethylene oxide, polypropylene oxide, polyacetal, and epoxy resin. Among the materials, polyethylene, polypropylene, and polystyrene are preferable as the three are capable of further preventing breakage from, for example, a part bonded by thermocompression when blow molding is performed during the production of the composite container 10A. The resin material may contain a copolymer resulting from polymerization of two or more monomer units constituting the above-mentioned resins. Further, the resin material may contain two or more of the above-mentioned resins. Further, various additives may be added to the material of the heat shrinkable plastic member 40a in addition to the main resin component insofar as the material is not impaired in terms of properties. Examples of the additives include a plasticizer, an ultraviolet stabilizer, a coloring inhibitor, a matting agent, a deodorant, a flame retardant, a weathering agent, an antistatic agent, a yarn friction reducing agent, a slip agent, a release agent, an antioxidant, an ion exchanger, and a coloring pigment.

The heat shrinkable plastic member 40a may contain a material having gas barrier properties such as oxygen barrier properties and water vapor barrier properties. In this case, it is possible, without using a multilayer preform, a blended material-containing preform, and the like as the preform 10a, to enhance the gas barrier properties of the composite container 10A, prevent oxygen permeation into the container, prevent content liquid deterioration, prevent water vapor transpiration from the inside of the container to the outside, and prevent a decrease in internal capacity. Conceivable as the material is polyethylene, polypropylene, MXD-6, PGA, EVOH, polyethylene naphthalate, or mixtures of those materials and an oxygen adsorbing material such as fatty acid salt. In a case where the heat shrinkable plastic member 40a has multiple layers, the heat shrinkable plastic member 40a may be provided with a layer made of the material having gas barrier properties.

The heat shrinkable plastic member 40a may contain a material having light ray barrier properties such as ultraviolet ray barrier properties. In this case, it is possible, without using a multilayer preform, a blended material-containing preform, and the like as the preform 10a, to enhance the light ray barrier properties of the composite container 10A and prevent content liquid deterioration attributable to ultraviolet rays or the like. Conceivable as the material is a resin material containing two or more of the above-mentioned resins or a material obtained by a light-shielding resin being added to polyethylene terephthalate, polyethylene, or polypropylene. Also, a foamed member may be used that has a foam cell diameter of 0.5 to 100 µm and is manufactured by mixing of an inert gas (nitrogen gas, argon gas) with a molten thermoplastic resin material. In a case where the heat shrinkable plastic member 40a has multiple layers, the heat shrinkable plastic member 40a may be provided with a layer made of the material having light ray barrier properties.

The heat shrinkable plastic member 40a may contain a material (low-thermal conductivity material) higher in heat retention properties or cold insulation properties than the plastic material constituting the preform 10a. In this case, it becomes possible to make it difficult for the temperature of a content liquid to be transmitted to the surface of the composite container 10A without increasing the thickness of the container main body 10 itself. As a result, the heat retention properties or the cold insulation properties of the composite container 10A are enhanced. Conceivable as the material is, for example, foamed polyurethane, polystyrene, polyethylene, polypropylene, phenol resin, polyvinyl chloride, urea resin, silicone, polyimide, and melamine resin. In a case where the heat shrinkable plastic member 40a has multiple layers, the heat shrinkable plastic member 40a may be provided with a layer made of the material (low-thermal conductivity material) high in heat retention properties or cold insulation properties. Also, it is preferable to mix hollow particles with a resin material containing the resins. The average particle diameter of the hollow particles is preferably 1 µm or more and 200 µm or less and more preferably 5 µm or more and 80 µm or less. The "average particle diameter" means a volume average particle diameter and can be measured by a known method and by means of a particle size distribution and particle diameter distribution measuring apparatus (such as the Nanotrac Particle Size Distribution Measuring Apparatus manufactured by Nikkiso Co., Ltd.). Although the hollow particles may be organic hollow particles that are made of resin or the like or may be inorganic hollow particles that are made of glass or the like, the organic hollow particles, which are excellent in dispersibility, are preferable. Examples of the resin constituting the organic hollow particles include styrene-based resin such as crosslinked styrene-acrylic resin, (meth)acrylic resin such as acrylonitrile-acrylic resin, phenolic resin, fluoro-based resin, polyamide-based resin, polyimide-based resin, polycarbonate-based resin, and polyether-based resin. Also usable are commercially available hollow particles such as ROPAQUE HP-1055, ROPAQUE HP-91, ROPAQUE OP-84J, ROPAQUE ULTRA, ROPAQUE SE, ROPAQUE ST, (manufactured by Rohm and Haas Co., Ltd.), Nipol MH-5055 (manufactured by Nippon Zeon Co., Ltd.), SX 8782, and SX 866 (manufactured by JSR Corporation). In a case where the heat shrinkable plastic member 40a has a single layer, the content of the hollow particles is preferably 0.01 parts by mass or more and 50 parts by mass or less and more preferably 1 part by mass or more and 20 parts by mass or less with respect to 100 parts by mass of the resin material contained in the heat shrinkable plastic member 40a. In a case where the heat shrinkable plastic member 40a has multiple layers, the content of the hollow particles is preferably 0.01 parts by mass or more and 50 parts by mass or less and more preferably 1 part by mass or more and 20 parts by mass or less with respect to 100 parts by mass of the resin material contained in the layer of the heat shrinkable plastic member 40a that contains the hollow particles.

The heat shrinkable plastic member 40a may contain a material less slippery than the plastic material constituting the preform 10a. In this case, a user can easily grip the composite container 10A even without changing the material of the container main body 10. In a case where the heat shrinkable plastic member 40a has multiple layers, the heat shrinkable plastic member 40a may be provided with a layer made of the material less slippery than the plastic material constituting the preform 10a. In this case, the layer is preferably the outermost layer of the heat shrinkable plastic member 40a.

The heat shrinkable plastic member 40a may be made of the same material as the container main body 10 (preform 10a). In this case, for example, the heat shrinkable plastic member 40 can be disposed mainly at a part of the composite container 10A where strength enhancement is desired and the strength of the place can be selectively enhanced. Examples of the material include a thermoplastic resin, especially polyethylene (PE), polypropylene (PP), polyethylene terephthalate (PET), polyethylene naphthalate (PEN), and polycarbonate (PC).

Figure 6:
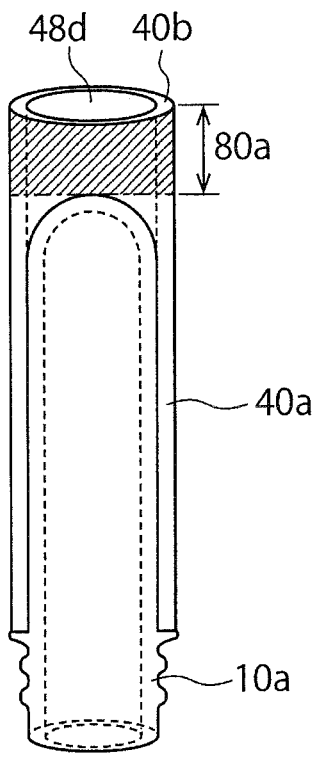
FIG. 6 is a vertical cross-sectional view illustrating a state where a preform is inserted in the heat shrinkable plastic member.

The length of the heat shrinkable plastic member 40a is longer than the total length of the body portion 20a and the bottom portion 30a of the preform 10a. As illustrated in FIG. 6, the heat shrinkable plastic member 40a has the margin 80a in the end portion (one end) 40b. The length of the margin 80a is preferably 3 mm or more and more preferably 5 mm or more and 20 mm or less. By the length of the margin 80a being within the numerical range described above, a thermocompression bonding step can be performed with greater ease, the material that is used can be reduced, and cost reduction can be achieved.

Figure 7:
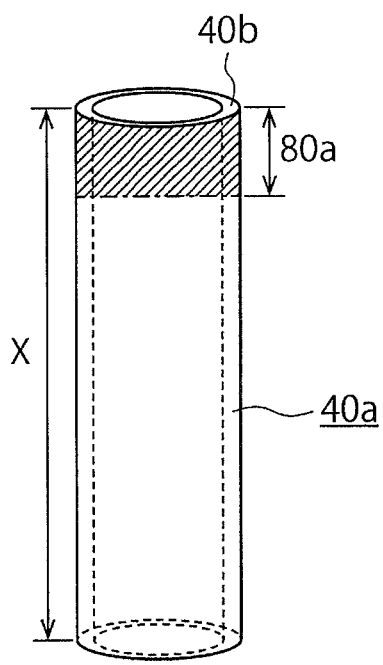
FIG. 7 is a front view of the heat shrinkable plastic member.
Figure 8:
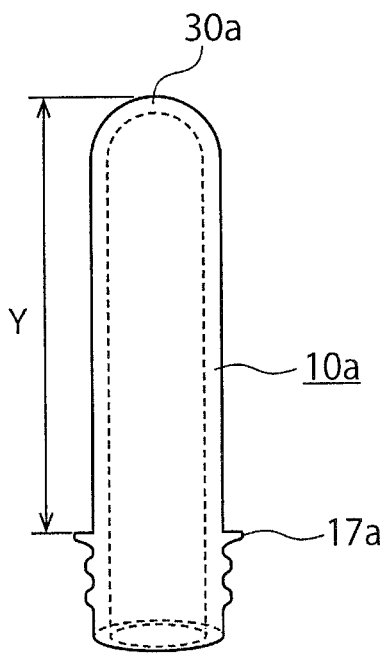
FIG. 8 is a front view of the preform.
Figure 9:
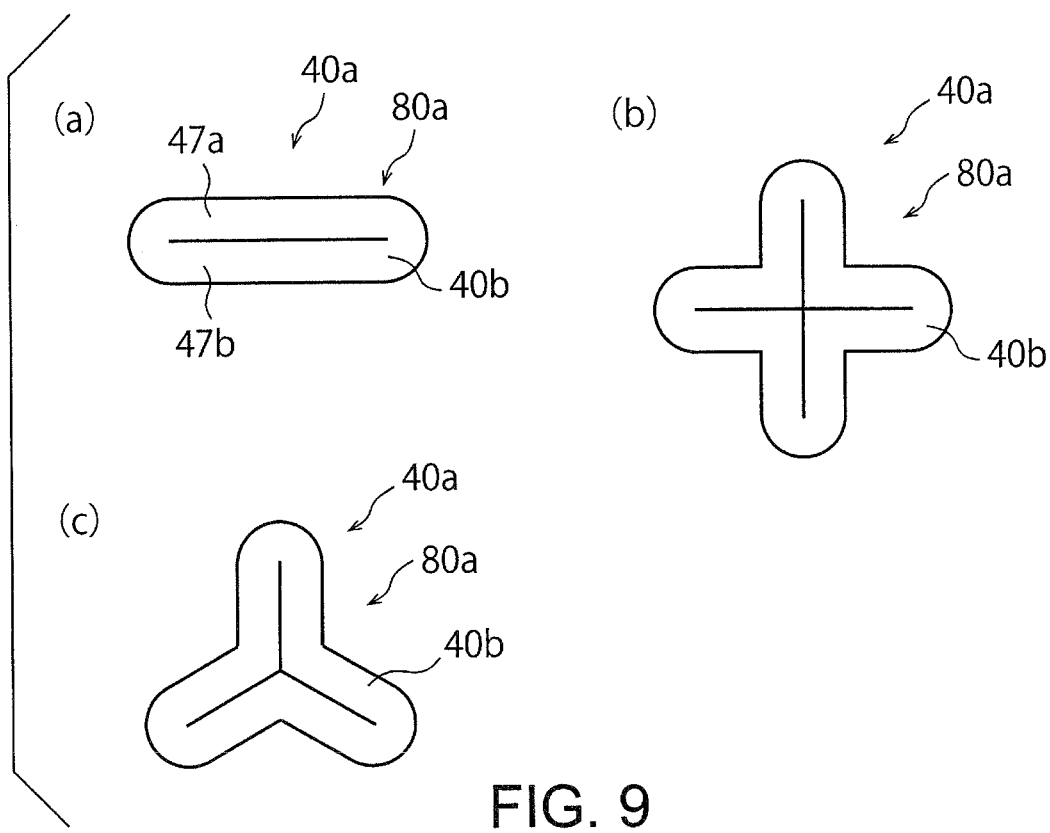
FIGS. 9(a) to 9(c) are diagrams illustrating the shape of a margin bonded by thermocompression.
Figure 10:
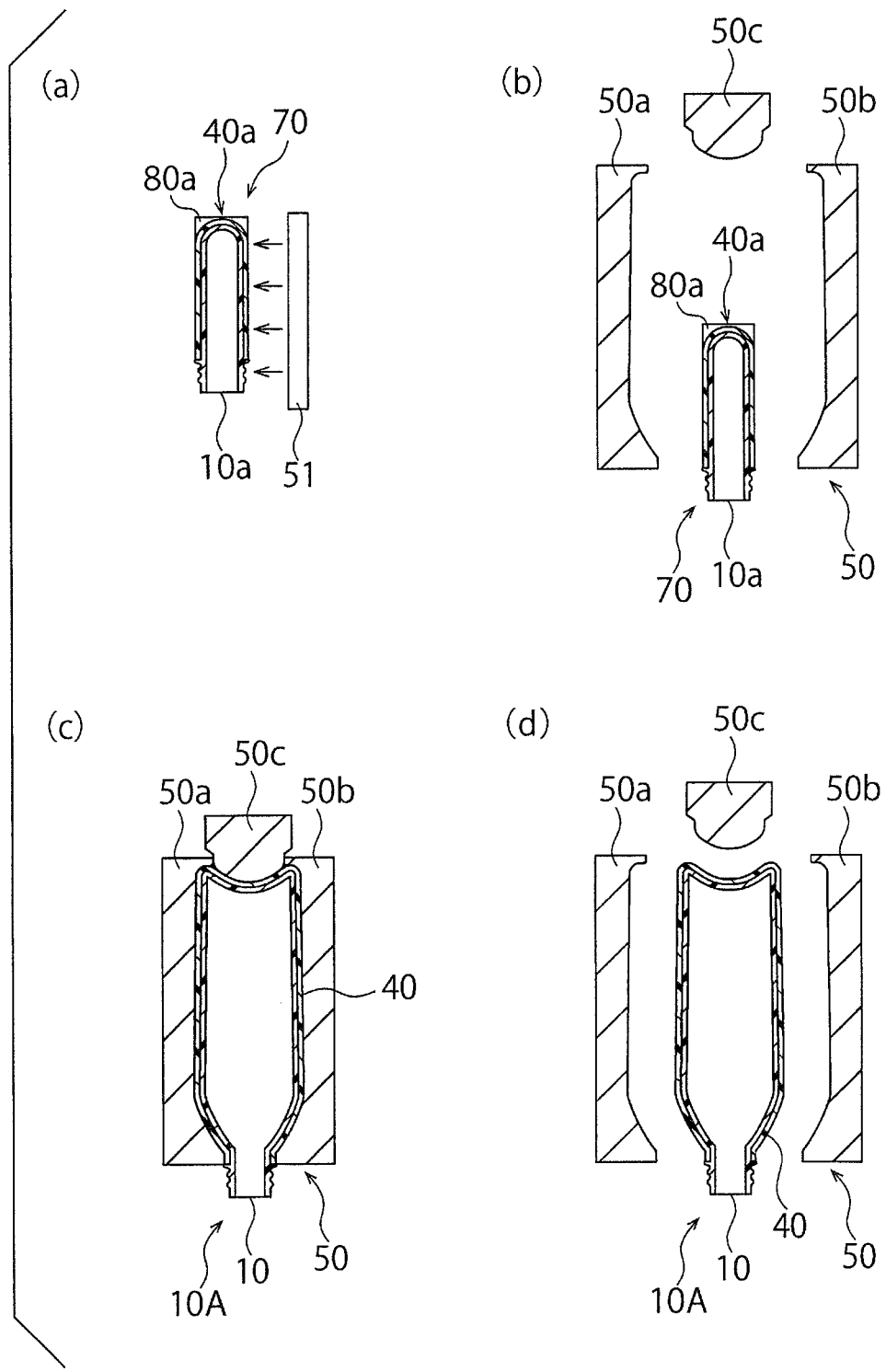
FIG. 10 is a schematic diagram illustrating a method for manufacturing the composite container.

As illustrated in FIG. 7, the length of the heat shrinkable plastic member 40a is the length of the pre-thermal shrinkage heat shrinkable plastic member 40a that includes the margin 80a and is a length X along the axial direction of the heat shrinkable plastic member 40a. As illustrated in FIG. 8, the length of the preform 10a is the length of the body portion 20a and the bottom portion 30a of the preform 10a excluding the mouth portion 11a and is a length Y measured along the axial direction of the preform 10a from a region 13a corresponding to the neck portion 13 to the bottom portion 30a.

The heat shrinkable plastic member 40a may be designed or printed. In this case, it is possible to display an image or a character on the composite container 10A after blow molding even without separate labeling or the like with respect to the container main body 10. The printing can be performed by a printing method such as an inkjet method, a gravure printing method, an offset printing method, and a flexo printing method. In a case where the inkjet method is used, for example, a UV curable ink is applied to the heat shrinkable plastic member 40a (40), UV irradiation is performed thereon, and curing is performed. Then, it is possible to form a printed layer. This printing may be applied to the heat shrinkable plastic member 40a that is yet to be inserted into the preform 10a or may be applied in a state where the heat shrinkable plastic member 40a is provided outside the preform 10a. Further, printing may be applied to the heat shrinkable plastic member 40 of the composite container 10A after blow molding. The heat shrinkable plastic member 40a may be colored in a visible light color such as red, blue, yellow, green, brown, black, and white or may be transparent or opaque.

Insertion Step

The heat shrinkable plastic member 40a manufactured in this manner and open at both ends is inserted into the preform 10a from one end side. At this time, the heat shrinkable plastic member 40a covers the periphery of the body portion 20a and the bottom portion 30a of the preform 10a excluding the mouth portion 11a. In this manner, the preform 10a is inserted from the side of the heat shrinkable plastic member 40a that is opposite to the side where the margin 80a is provided as illustrated in FIG. 6.

Thermal Shrinkage Step

Next, the preform 10a and the heat shrinkable plastic member 40a are heated. As a result, the heat shrinkable plastic member 40a undergoes thermal shrinkage and comes into close contact with the outer surface of the preform 10a.

Methods for heating the preform 10a and the heat shrinkable plastic member 40a are not particularly limited, and the heating can be appropriately performed by means of infrared rays, hot air, or the like. The heating temperature is preferably 60° C. or more and 250° C. or less and more preferably 80° C. or more and 150° C. or less. The heating temperature is the surface temperature of the heat shrinkable plastic member 40a during heating and is not the irradiation temperature of infrared rays, hot air, or the like.

Thermocompression Bonding Step

Next, the margin 80a formed in the end portion (one end) 40b of the plastic member 40a, which is opposite to the preform 10a-inserted end portion (end portion on the mouth portion 11a side), is bonded by thermocompression. This thermocompression bonding can be performed by the end portion 40b of the plastic member 40a being sandwiched in a horizontal direction by a pair of compression bonding instruments (not illustrated) after a compression bonding portion is heated by means of infrared rays, hot air, or the like. As a result, the opening 48d (FIG. 6) formed in the cylindrical end portion 40b of the plastic member 40a is blocked, and the first facing surface 46a and the second facing surface 46b can be bonded by thermocompression. The material of the compression bonding instrument is not particularly limited, and a metallic instrument or a heat-resistant resin-based instrument can be used. Methods for bonding the margin 80a by thermocompression are not limited to the above. Insofar as compression bonding can be performed with the margin sandwiched or the like after heating by means of infrared rays, hot air, or the like, a metallic or heat-resistant resin-based instrument (hereinafter, referred to as the "compression bonding instrument" in some cases) or the like can be used and a combination of the instruments may be used.

The shape of the post-thermocompression bonding margin 80a is not particularly limited, and the shape can be any shape as illustrated in FIGS. 9(a) to 9(c).

In other words, as illustrated in FIG. 9(a), the first facing surface 46a and the second facing surface 46b formed in the end portion 40b of the plastic member 40a may be compression-bonded substantially in a straight line along the radial direction of the body portion 20a when viewed from the bottom surface direction. The end portion 40b of the plastic member 40a may be compression-bonded in a cross shape when viewed from the bottom surface direction (FIG. 9(b)) and the compression bonding portions of the end portion 40b may be disposed so as to be equally distributed by approximately 120° when viewed from the bottom surface direction (FIG. 9(c)).

The surface of the compression bonding instrument may be flat or may have an uneven shape in part or in whole.

A heating mechanism may be provided on the surface of the compression bonding instrument. Then, it is possible to further enhance the compression bonding strength of the margin 80a. It is preferable that the heating temperature of the surface of the compression bonding instrument is, for example, 100° C. or more and 250° C. or less.

The pressure during compression bonding is preferably 50 N/cm² or more and 1,000 N/cm² or less and more preferably 100 N/cm² or more and 500 N/cm² or less.

The temperature of the heat shrinkable plastic member 40a during compression bonding is preferably 80° C. or more and 200° C. or less although the temperature depends on materials.

The post-thermocompression bonding margin 80a may be cut to an appropriate length as desired. Once the margin is cut to the appropriate length (such as approximately 2 mm), the bottom portion has a decent appearance when the composite container is completed.

The post-thermal shrinkage heat shrinkable plastic member 40a is not adhered to the outer surface of the preform 10a and is in close contact with the preform 10a to the extent of not moving or rotating or to the extent of not falling due to its own weight.

As illustrated in FIG. 2, after the margin 80a is compression-bonded, the plastic member 40a has a bottomed cylindrical shape and has a cylindrical body portion 41 and a bottom portion 42 connected to the body portion 41. In this case, the bottom portion 42 of the plastic member 40a covers the bottom portion 30a of the preform 10a, and thus various functions and characteristics can be imparted to the bottom portion 30 in addition to the body portion 20 of the composite container 10A.

Method for Manufacturing Composite Container

The method for manufacturing a composite container according to the present embodiment includes a step for heating the composite preform 70 manufactured as described above and inserting the composite preform 70 into a blow molding mold and a step for integrally expanding the preform 10a and the heat shrinkable plastic member 40a by performing blow molding on the composite preform 70 after the heating.

The method for manufacturing the composite container 10A of the present invention will be described in more detail with reference to FIGS. 10(a) to 10(d).

First, the composite preform 70 described above is prepared. This composite preform 70 is provided with the preform 10a and the heat shrinkable plastic member 40a that has a substantially bottomed cylindrical shape and is provided so as to surround the outside of the preform 10a, and the plastic member 40a is bonded by thermocompression at the margin 80a. Subsequently, the composite preform 70 is heated by a heating device 51 (see FIG. 10(a)). At this time, the composite preform 70 is uniformly heated in the circumferential direction by the heating device 51 while rotating with the mouth portion 11a facing downwards. The heating temperature of the preform 10a and the plastic member 40a in this heating step may be, for example, 90° C. to 130° C.

Subsequently, the composite preform 70 heated by the heating device 51 is sent to the blow molding mold 50 (see FIG. 10(b)).

The composite container 10A is molded by means of this blow molding mold 50. In this case, the blow molding mold 50 includes a pair of body portion molds 50a and 50b divided from each other and a bottom portion mold 50c (see FIG. 10(b)). In FIG. 10(b), the pair of body portion molds 50a and 50b are open to each other, and the bottom portion mold 50c is raised upwards. In this state, the composite preform 70 is inserted between the pair of body portion molds 50a and 50b.

Next, as illustrated in FIG. 10(c), the pair of body portion molds 50a and 50b are closed after the bottom portion mold 50c is lowered. Then, the blow molding mold 50 that is sealed by the pair of body portion molds 50a and 50b and the bottom portion mold 50c is constituted. Next, air is pressed into the preform 10a and biaxial stretch blow molding is applied to the composite preform 70.

As a result, the container main body 10 is obtained from the preform 10a in the blow molding mold 50. Meanwhile, the body portion molds 50a and 50b are heated to 30° C. to 80° C. and the bottom portion mold 50c is cooled to 5° C. to 25° C. At this time, the plastic member 40a and the preform 10a of the composite preform 70 are integrally expanded in the blow molding mold 50. As a result, the preform 10a and the plastic member 40a are integrated into a shape corresponding to the inner surface of the blow molding mold 50.

In this manner, the composite container 10A that is provided with the container main body 10 and the plastic member 40 provided on the outer surface of the container main body 10 is obtained.

Next, as illustrated in FIG. 10(d), the pair of body portion molds 50a and 50b and the bottom portion mold 50c are separated from each other and the composite container 10A is taken out from the inside of the blow molding mold 50.

Example

Hereinafter, the present embodiment will be described in more detail based on examples. The present embodiment is not limited to the examples.

(Step for Preparing Preform 10a)

The preform 10a that is made of PET and illustrated in FIG. 8 was manufactured by means of an injection molding machine. The weight of this preform 10a was 23.8 g and the length Y of the preform 10a was 90 mm.

(Step for Preparing Heat Shrinkable Plastic Member 40a)

A polyolefin resin was melted and extruded from a ring-shaped die. Next, diameter enlargement was performed by the inner surface of the extruded tube being pressurized or the outer surface of the tube being given a negative pressure from the inner surface, and the heat shrinkable plastic member 40a was manufactured. The length X of the manufactured heat shrinkable plastic member 40a was 100 mm and the length of the margin 80a was 10 mm.

(Insertion Step)

Next, the preform 10a was manually inserted from the end of the heat shrinkable plastic member 40a that is opposite to the margin 80a.

(Thermal Shrinkage and Thermocompression Bonding Steps)

After the insertion, thermal shrinkage was performed on the heat shrinkable plastic member 40a by the preform 10a and the heat shrinkable plastic member 40a being heated to 100° C. by means of an infrared heater. Next, the margin 80a was sandwiched and bonded by thermocompression at a pressure of 300 N/cm² by means of a metal plate heated to 100° C., and the composite preform 70 was obtained.

(Composite Container Production)

The composite preform 70 obtained as described above was heated to 100° C. by means of an infrared heater and transported to the blow molding mold that is illustrated in FIG. 10b. The composite preform 70 was blow-molded in this blow molding mold, and the composite container 10A having a full filling capacity of 500 mL was obtained. The plastic member 40 of the composite container 10A covered the bottom portion 30 of the container main body 10, and no compression bonding portion peeling or breakage was observed.

Second Embodiment

Next, a second embodiment of the present invention will be described with reference to FIGS. 11 to 14. FIGS. 11 to 14 are diagrams illustrating the second embodiment of the present invention. In the second embodiment illustrated in FIGS. 11 to 14, the position where the margin 80a is compression-bonded is different, and the other configurations are substantially identical to those of the first embodiment described above. In FIGS. 11 to 14, the same parts as those of the first embodiment illustrated in FIGS. 1 to 13 are denoted by the same reference numerals, and detailed description thereof will be omitted.

Figure 11:
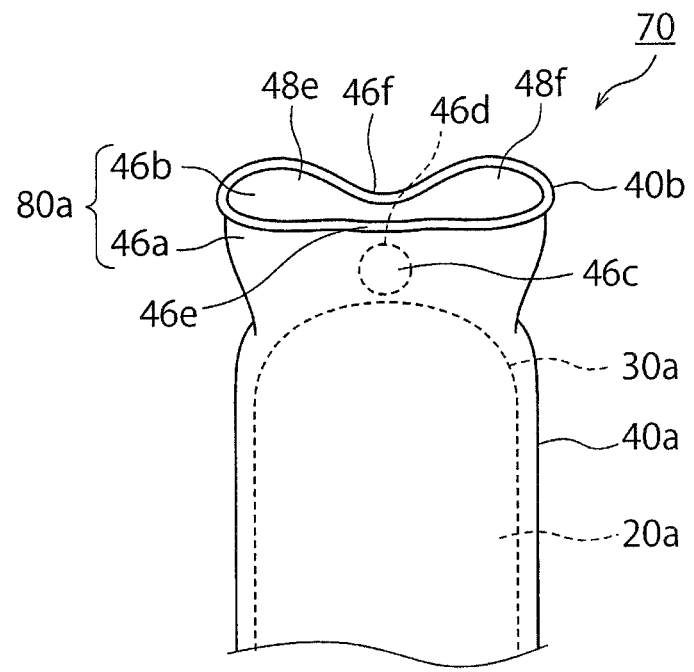
FIG. 11 is a perspective view illustrating the bottom portion side of a composite preform according to a second embodiment of the present invention.
Figure 12:
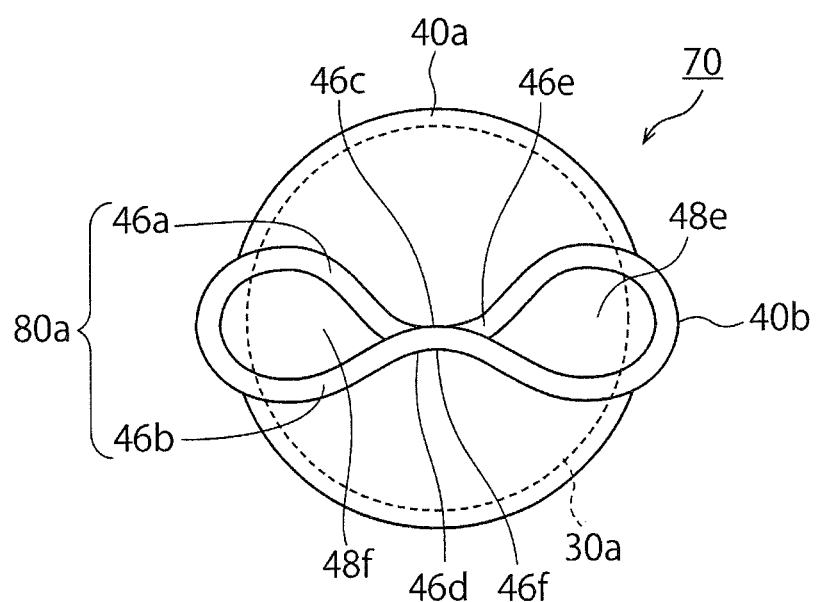
FIG. 12 is a bottom view illustrating the composite preform according to the second embodiment of the present invention.

As illustrated in FIGS. 11 and 12, in the composite preform 70 according to the present embodiment, the first facing surface 46a and the second facing surface 46b that are disposed to face each other are formed at the margin 80a. The first facing surface 46a and the second facing surface 46b are formed in an annular shape as a whole and constitute the end portion 40b of the plastic member 40a.

In this case, a part of the first facing surface 46a and a part of the second facing surface 46b are compression-bonded to each other. Specifically, a first compression bonding part 46c having a substantially intermediate position in the radial direction of the body portion 20a in the first facing surface 46a and a second compression bonding part 46d having a substantially intermediate position in the radial direction of the body portion 20a in the second facing surface 46b are bonded by thermocompression to each other. As a result, the first compression bonding part 46c and the second compression bonding part 46d are connected to each other, and the first facing surface 46a and the second facing surface 46b are integrated. The first facing surface 46a and the second facing surface 46b are formed in the shape of ∞ (or number 8) as a whole when viewed from the bottom surface direction. Accordingly, a pair of openings 48e and 48f are formed between the first facing surface 46a and the second facing surface 46b.

In this case, the first facing surface 46a and the second facing surface 46b are compression-bonded in a state of mutual misalignment in the upward-downward direction (axial direction of the heat shrinkable plastic member 40a). In other words, an end edge 46e of the first facing surface 46a and an end edge 46f of the second facing surface 46b are mutually misaligned in a state where the first compression bonding part 46c and the second compression bonding part 46d are compression-bonded. In this case, the end edge 46f of the second facing surface 46b is positioned more outwards than the end edge 46e of the first facing surface 46a (on a side that is far from the body portion 20a).

In a case where the composite preform 70 is manufactured, a step for compression-bonding a part of the first facing surface 46a and a part of the second facing surface 46b to each other follows a step for performing thermal shrinkage on the heat shrinkable plastic member 40a and precedes a step for heating the composite preform 70 by means of the heating device 51 (FIG. 10(a)). Specifically, the first compression bonding part 46c of the first facing surface 46a and the second compression bonding part 46d of the second facing surface 46b are sandwiched inwards, by means of a thermocompression bonding tool or the like, in a state where the heat shrinkable plastic member 40a has a high temperature immediately after the thermal shrinkage step, and the first compression bonding part 46c and the second compression bonding part 46d are compression-bonded as a result.

Figure 13:
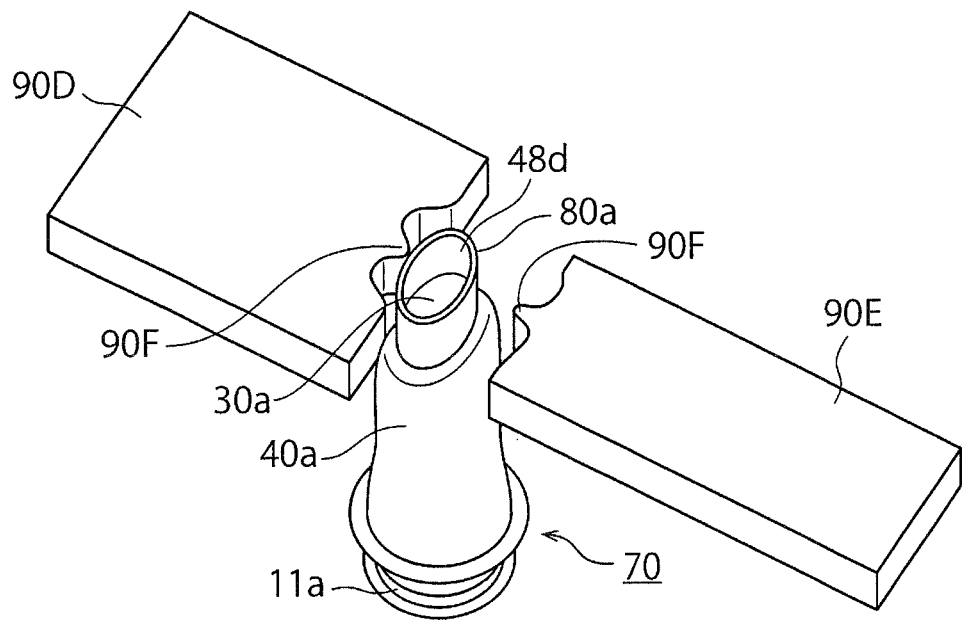
FIG. 13 is a perspective view illustrating a step for performing thermocompression bonding on a margin of the composite preform according to the second embodiment of the present invention.
Figure 14:
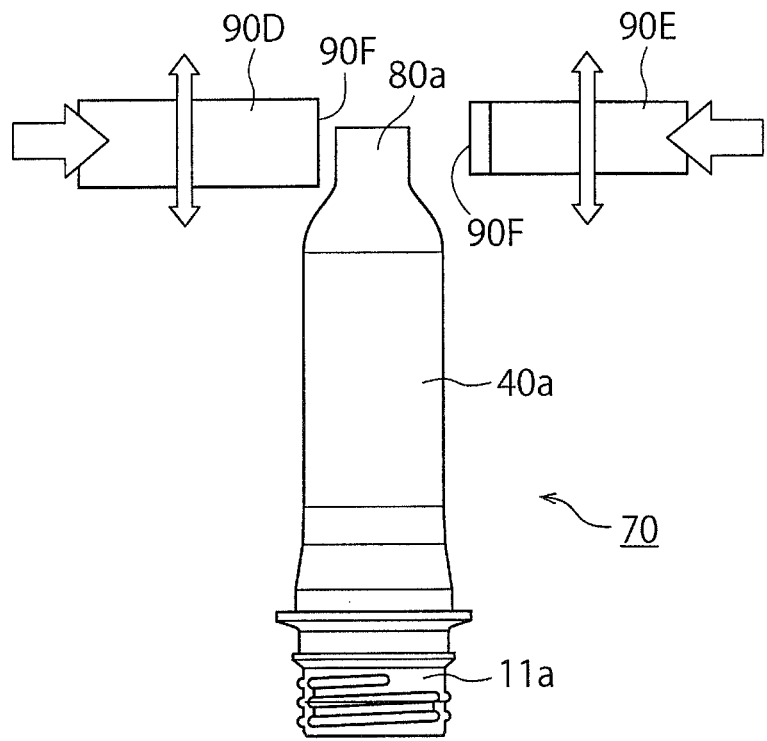
FIG. 14 is a front view illustrating the step for performing thermocompression bonding on the margin of the composite preform according to the second embodiment of the present invention.

In other words, as illustrated in FIGS. 13 and 14, it is possible to compression-bond the first facing surface 46a and the second facing surface 46b by sandwiching the end portion 40b of the plastic member 40a by means of a pair of compression bonding instruments 90D and 90E. Each of the pair of compression bonding instruments 90D and 90E has a compression bonding point 90F. In addition, the compression bonding instrument 90D is thicker than the compression bonding instrument 90E. In this case, a pair of compression bonding instruments 90A and 90B are brought close to each other from both sides in the axial direction of the plastic member 40a such that the pair of compression bonding points 90F sandwich the first facing surface 46a and the second facing surface 46b. As a result, the opening 48d (FIG. 13) formed in the cylindrical end portion 40b of the plastic member 40a is partially blocked, and the first facing surface 46a and the second facing surface 46b can be bonded by thermocompression. The shape of the part where the first facing surface 46a and the second facing surface 46b are bonded by thermocompression (shapes of the first compression bonding part 46c and the second compression bonding part 46d viewed from the front side) can be circular, square, rectangular, rhombic, and so on.

Alternatively, the first facing surface 46a and the second facing surface 46b may be melted and compression-bonded by means of a heated tool (not illustrated) or the like after cooling of the heat shrinkable plastic member 40a. Further, the first facing surface 46a and the second facing surface 46b may be melted and compression-bonded by means of heat generation resulting from ultrasonic vibration of a tool (not illustrated) or the like after cooling of the heat shrinkable plastic member 40a.

As described above, according to the present embodiment, the margin 80a is deformed such that the first facing surface 46a and the second facing surface 46b are narrowed during blow molding of the composite preform 70, and thus the heat shrinkable plastic member 40 and the bottom portion 30 of the container main body 10 are in close contact with uniformity after the blow molding and the appearance of the bottom portion 30 can be decent. At the same time, air is discharged from the pair of openings 48e and 48f in the blow molding step, and thus it is possible to more effectively restrain air from remaining between the heat shrinkable plastic member 40 and the bottom portion 30 of the container main body 10. Further, a part of the first facing surface 46a and a part of the second facing surface 46b are compression-bonded to each other, and thus the close contact between the heat shrinkable plastic member 40 and the bottom portion 30 of the container main body 10 can be made more reliable, and it is possible to manufacture the composite container 10A that is decent in appearance and excellent in light shielding properties with high quality.

According to the present embodiment, the end edge 46e of the first facing surface 46a and the end edge 46f of the second facing surface 46b are mutually misaligned in a state where the first compression bonding part 46c and the second compression bonding part 46d are compression-bonded. As a result, the pair of openings 48e and 48f are unlikely to be closed during blow molding of the composite preform 70, and thus air is easily discharged from the pair of openings 48e and 48f and air stagnation between the heat shrinkable plastic member 40 and the bottom portion 30 of the container main body 10 can be further suppressed.

Third Embodiment

Next, a third embodiment of the present invention will be described. FIGS. 15 to 18 are diagrams illustrating the third embodiment of the present invention. The third embodiment illustrated in FIGS. 15 to 18 differs from the first embodiment in that the plastic member 40a has an end portion compression-bonded along the shape of the bottom portion 30a of the preform 10a to form a compression bonding bottom portion 45, and the other configurations are substantially identical to those of the first embodiment described above. In FIGS. 15 to 18, the same parts as those of the first embodiment illustrated in FIGS. 1 to 10 are denoted by the same reference numerals, and detailed description thereof will be omitted.

Composite Preform 70

Figure 15:
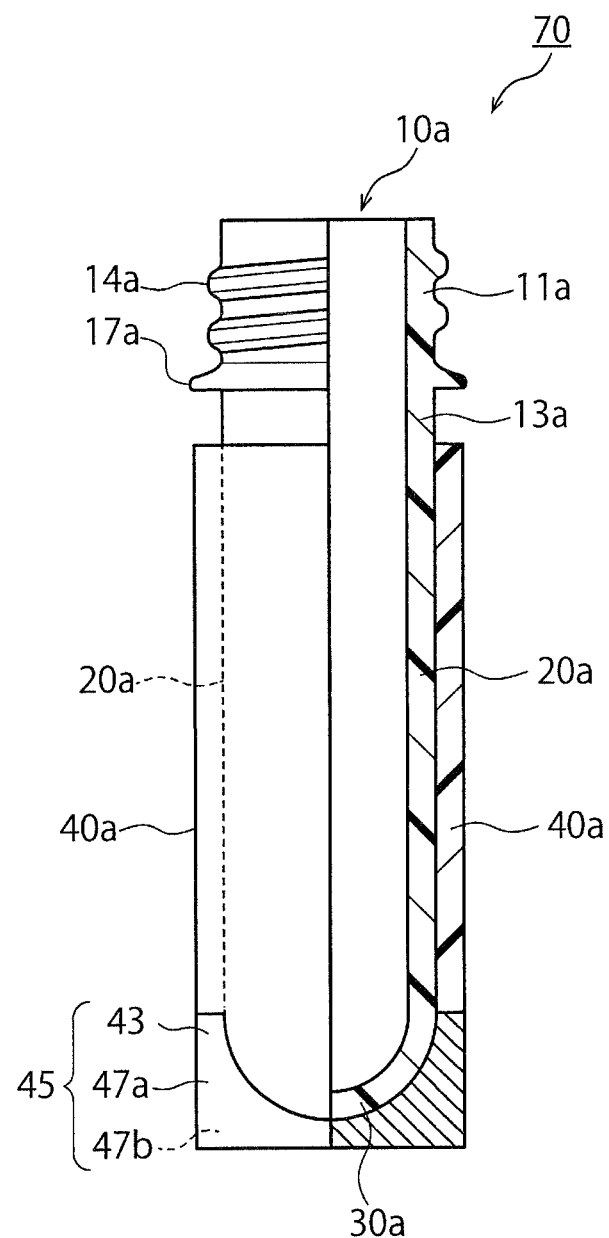
FIG. 15 is a partial vertical cross-sectional view of a composite preform according to a third embodiment of the present invention.

FIG. 15 is a diagram illustrating the composite preform 70 according to the present embodiment. The composite preform 70 according to the present embodiment is provided with the preform 10a formed from a plastic material and the heat shrinkable plastic member 40a, which has a substantially bottomed cylindrical shape and is provided so as to surround the outside of the preform 10a.

As indicated by hatching in FIG. 15, in this case, the end portion 40b of the plastic member 40a on the bottom portion side of the preform 10a is compression-bonded along the shape of the bottom portion 30a of the preform 10a to form the compression bonding bottom portion 45.

In the present embodiment, the composite container 10A can be obtained by blow molding of the composite preform 70 illustrated in FIG. 15.

Preform 10a

The configuration of the preform 10a is identical to that illustrated in the first embodiment (see FIGS. 1 and 2), and detailed description thereof will be omitted here.

Heat Shrinkable Plastic Member 40a

As illustrated in FIG. 15, the heat shrinkable plastic member 40a is provided so as to surround the outside of the preform 10a, without adhering to the preform 10a, and is in close contact with the preform 10a to the extent of not moving or rotating or to the extent of not falling due to its own weight.

The heat shrinkable plastic member 40a is provided over the entire circumferential region of the preform 10a so as to surround the preform 10a. As illustrated in FIG. 15, one end of the heat shrinkable plastic member 40a that is on the bottom portion 30a side of the preform 10a is bonded by thermocompression along the shape of the bottom portion 30a of the preform 10a to form the compression bonding bottom portion 45.

In other words, the compression bonding bottom portion 45 of the heat shrinkable plastic member 40a has a curved surface portion 43 formed along the shape of the bottom portion 30a of the preform 10a and a first piece 47a and a second piece 47b respectively protruding from the curved surface portion 43. The first piece 47a and the second piece 47b are bonded and integrated with each other by thermocompression. Each of the first piece 47a and the second piece 47b extends substantially in a straight line along the radial direction of the body portion 20a when viewed from the bottom surface direction. In this case, the first piece 47a and the second piece 47b are compression-bonded over the entire region in the radial direction of the body portion 20a.

By one end of the heat shrinkable plastic member 40a being bonded by thermocompression along the shape of the bottom portion 30a of the preform 10a as described above, it is possible to obtain the composite container 10A in which the bottom portion 30 of the container main body 10 is covered with the plastic member 40 and it is possible to improve the close contactability of the plastic member 40 with respect to the container main body 10 as bubbles are not generated during blow molding. In addition, since no bubbles are present, the appearance of the composite container 10A can be improved as well.

The same material as that illustrated in the first embodiment can be used as the material of the heat shrinkable plastic member 40a.

Method for Manufacturing Composite Preform 70

Next, a method for manufacturing the composite preform 70 according to the present embodiment will be described.

The method for manufacturing the composite preform 70 according to the present embodiment includes a step for preparing the preform 10a provided with the mouth portion 11a, the body portion 20a connected to the mouth portion 11a, and the bottom portion 30a connected to the body portion 20a, a step for preparing the tubular heat shrinkable plastic member 40a longer than the preform 10a, a step for inserting the preform 10a from one end of the plastic member 40a, a step for performing thermal shrinkage on the plastic member 40a by heating the preform 10a and the plastic member 40a, and a step for bonding the other end of the plastic member 40a on the bottom portion 30a side of the preform 10a by thermocompression along the shape of the bottom portion 30a of the preform 10a.

Step for Preparing Preform and Heat Shrinkable Plastic Member

First, the preform 10a and the heat shrinkable plastic member 40a are prepared as in the case of the first embodiment.

Figure 16:
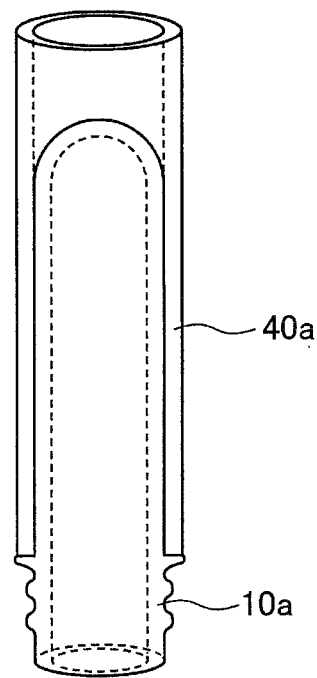
FIG. 16 is a vertical cross-sectional view illustrating a state where a preform is inserted in a heat shrinkable plastic member.

As illustrated in FIG. 16, the length of the heat shrinkable plastic member 40a is longer than the sum of the lengths of the body portion 20a and the bottom portion 30a of the preform 10a. Specifically, the length of the heat shrinkable plastic member 40a exceeds the length of the body portion 20a and the bottom portion 30a of the preform 10a preferably by 3 mm or more and more preferably by 5 mm or more and 20 mm or less. By the length being within the numerical range described above, a thermocompression bonding step can be performed with greater ease, the material that is used can be reduced, and cost reduction can be achieved.

Figure 17:
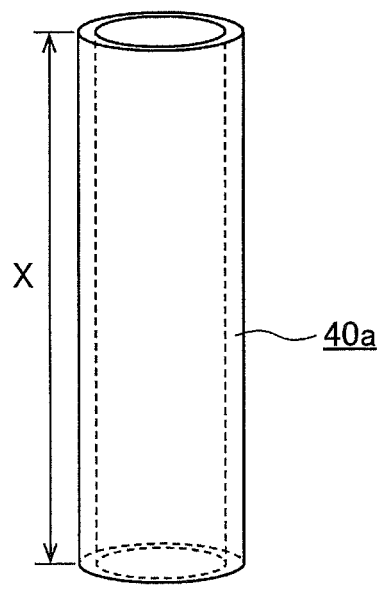
FIG. 17 is a front view of the heat shrinkable plastic member.

As illustrated in FIG. 17, in the present embodiment, the length of the heat shrinkable plastic member 40a is the length of the pre-thermal shrinkage heat shrinkable plastic member 40a and is the length X along the axial direction of the heat shrinkable plastic member 40a. The sum of the lengths of the body portion 20a and the bottom portion 30a of the preform 10a is the length of the body portion 20a and the bottom portion 30a of the preform 10a excluding the mouth portion 11a and is the length Y along the axial direction of the preform 10a (see FIG. 8).

Insertion Step

The heat shrinkable plastic member 40a manufactured in this manner and open at both ends is inserted into the preform 10a from one end side. In other words, the preform 10a is inserted from one end of the heat shrinkable plastic member 40a as illustrated in FIG. 16.

Thermal Shrinkage Step

Next, the preform 10a and the heat shrinkable plastic member 40a are heated. As a result, the heat shrinkable plastic member 40a undergoes thermal shrinkage and comes into close contact with the outer surface of the preform 10a.

Thermocompression Bonding Step

Next, the end portion (the other end) 40b of the plastic member 40a, which is opposite to the preform 10a-inserted end portion (end portion on the mouth portion 11a side), is bonded by thermocompression. This thermocompression bonding can be performed by the end portion 40b of the plastic member 40a being sandwiched by the pair of compression bonding instruments 90A and 90B illustrated in FIG. 18 after a compression bonding portion is heated by means of infrared rays, hot air, or the like. Each of the pair of compression bonding instruments 90A and 90B has a substantially semicylindrical (or substantially hemispherical) recessed receiving portion 90C having a shape corresponding to the bottom portion 30a of the preform 10a. In this case, the pair of compression bonding instruments 90A and 90B are brought close to each other from both sides in the axial direction of the plastic member 40a and moved such that the pair of recessed receiving portions 90C wrap the bottom portion 30a of the preform 10a. As a result, the opening 48d formed in the cylindrical end portion 40b of the plastic member 40a is blocked, and the first piece 47a and the second piece 47b can be bonded by thermocompression and form the compression bonding bottom portion 45. The materials of the compression bonding instruments 90A and 90B are not particularly limited, and a metallic instrument or a heat-resistant resin-based instrument can be used.

Figure 18:
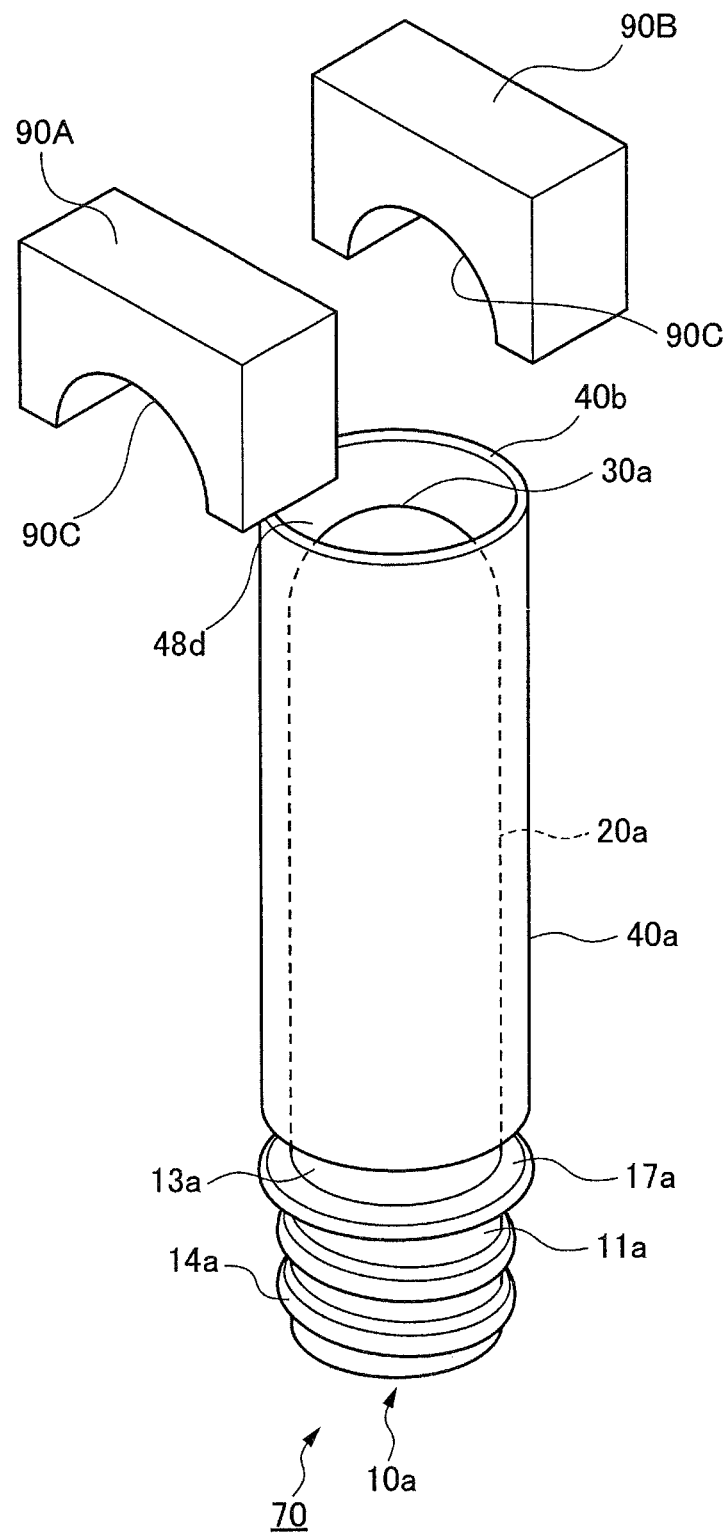
FIG. 18 is a perspective view illustrating a compression bonding instrument according to the third embodiment of the present invention.

The end portion 40b of the plastic member 40a can be bonded by thermocompression along the bottom portion 30a of the preform 10a by means of the compression bonding instruments 90A and 90B illustrated in FIG. 18. The shapes of the compression bonding instruments 90A and 90B are not particularly limited insofar as the plastic member 40a can be bonded by thermocompression along the bottom portion 30a of the preform 10a. The surface of the recessed receiving portion 90C of the compression bonding instruments 90A and 90B may be flat or may have an uneven shape in part or in whole. Further, a heating mechanism may be provided on the surfaces of the compression bonding instruments 90A and 90B. Then, it is possible to further enhance the compression bonding strength. It is preferable that the heating temperature of the surface of the compression bonding instrument is, for example, 100° C. or more and 250° C. or less.

The pressure during compression bonding is preferably 50 N/cm$^2$ or more and 1,000 N/cm$^2$ or less and more preferably 100 N/cm$^2$ or more and 500 N/cm$^2$ or less.

The temperature of the heat shrinkable plastic member 40a during compression bonding is preferably 80° C. or more and 200° C. or less although the temperature depends on materials.

After thermocompression bonding, the end portion 40b of the plastic member 40a may be cut to an appropriate length as desired. As a result, the bottom portion 30 has a decent appearance when the composite container 10A is completed. Specifically, it is preferable that the cutting is performed such that a length Z (see FIG. 1) from the vertex of the bottom portion 30a of the preform 10a to the endmost part of the compression-bonded plastic member 40a is 0.5 mm or more and 5 mm or less. As illustrated in FIG. 2, the compression bonding bottom portion 45 may be linearly cut or may be cut in a curved shape (not illustrated) along the shape of the bottom portion of the preform 10a.

The post-thermal shrinkage heat shrinkable plastic member 40a is not adhered to the outer surface of the preform 10a and is in close contact with the preform 10a to the extent of not moving or rotating or to the extent of not falling due to its own weight.

Composite Container 10A

The configuration of the composite container 10A manufactured by means of the composite preform 70 according to the present embodiment is substantially identical to that according to the first embodiment.

Also in the present embodiment, the heat shrinkable plastic member 40 is in close contact with the outer surface of the container main body 10 in a thinly extended state and is attached to the container main body 10 in a state of not moving or rotating with ease. One end of the heat shrinkable plastic member 40 on the bottom portion 30 side of the container main body 10 is compression-bonded to form the compression bonding bottom portion 45A (see FIG. 3). In this case, the heat shrinkable plastic member 40 is compression-bonded at a position covering the bottom portion 30 of the container main body 10. Specifically, the first piece 47a and the second piece 47b (FIG. 15) of the heat shrinkable plastic member 40a of the composite preform 70 described above are bonded by thermocompression so as to be overlapped with each other. As a result, the opening 48d (FIG. 18) of the heat shrinkable plastic member 40a is blocked after blow molding, and the bottom portion 30 is completely covered by the heat shrinkable plastic member 40.

Method for Manufacturing Composite Container

The method for manufacturing the composite container 10A according to the present embodiment is substantially identical to that according to the first embodiment. In other words, the method for manufacturing the composite container 10A according to the present embodiment includes a step for heating the composite preform 70 described above and inserting the composite preform 70 into a blow molding mold and a step for integrally expanding the preform 10a and the heat shrinkable plastic member 40a by performing blow molding on the composite preform 70 after the heating.

Example

Hereinafter, the present embodiment will be described in more detail based on examples. The present embodiment is not limited to the examples.

(Step for Preparing Preform 10a)

The preform 10a that is made of PET and illustrated in FIG. 8 was manufactured by means of an injection molding machine. The weight of this preform 10a was 23.8 g and the sum Y of the lengths of the body portion 20a and the bottom portion 30a of the preform 10a was 90 mm.

(Step for Preparing Heat Shrinkable Plastic Member 40a)

A polyolefin resin was melted and extruded from a ring-shaped die. Next, diameter enlargement was performed by the inner surface of the extruded tube being pressurized or the outer surface of the tube being given a negative pressure from the inner surface, and the heat shrinkable plastic member 40a was manufactured. The length X of the manufactured heat shrinkable plastic member 40a was 100 mm.

(Insertion Step)

Next, the preform 10a was manually inserted from one end of the heat shrinkable plastic member 40a.

(Thermal Shrinkage and Thermocompression Bonding Steps)

After the insertion, thermal shrinkage was performed on the heat shrinkable plastic member 40a by the preform 10a and the heat shrinkable plastic member 40a being heated to 100° C. by means of an infrared heater. Next, thermocompression bonding was performed along the shape of the bottom portion 30a of the preform 10a by one end of the plastic member 40a being sandwiched at a pressure of 300 N/cm$^2$ by means of the pair of compression bonding instruments 90A and 90B heated to 100° C. and illustrated in FIG. 18, and the composite preform 70 was obtained.

(Production of Composite Container 10A)

The composite preform 70 obtained as described above was heated to 100° C. by means of an infrared heater and transported to a blow molding mold. The composite preform 70 was blow-molded in this blow molding mold, and the composite container 10A having a full filling capacity of 500 mL was obtained. The plastic member 40 of the composite container 10A covered the bottom portion of the container main body 10. In addition, no compression bonding portion peeling or breakage was observed and no presence of bubbles could be confirmed.

Fourth Embodiment

Figure 19:
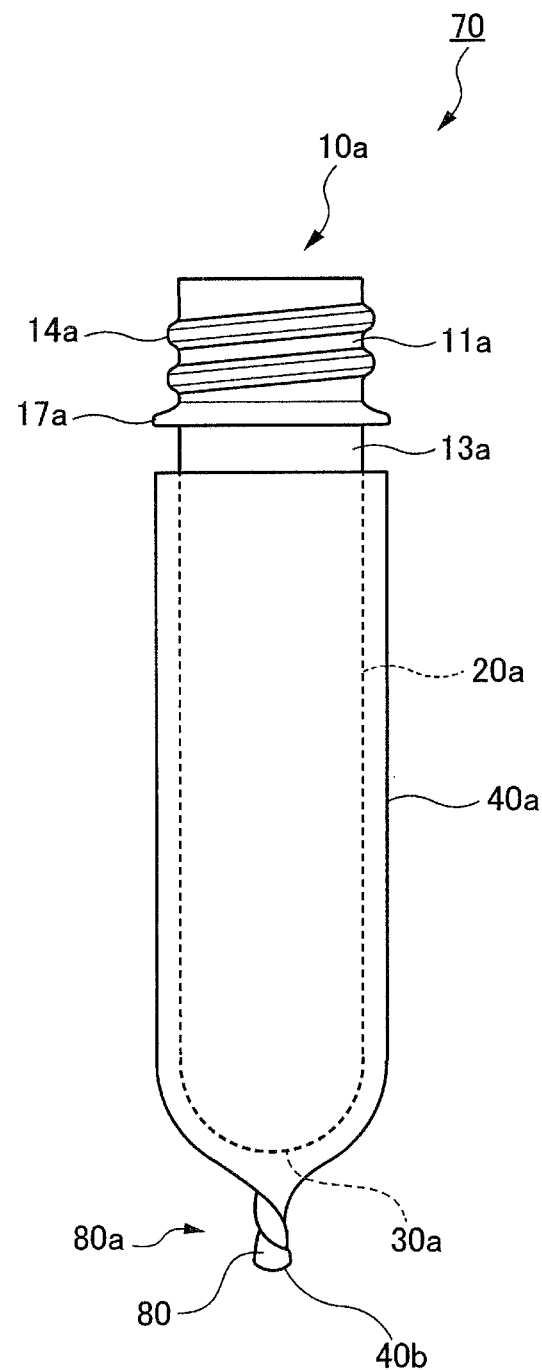
FIG. 19 is a front view of a composite preform according to a fourth embodiment of the present invention.
Figure 20:
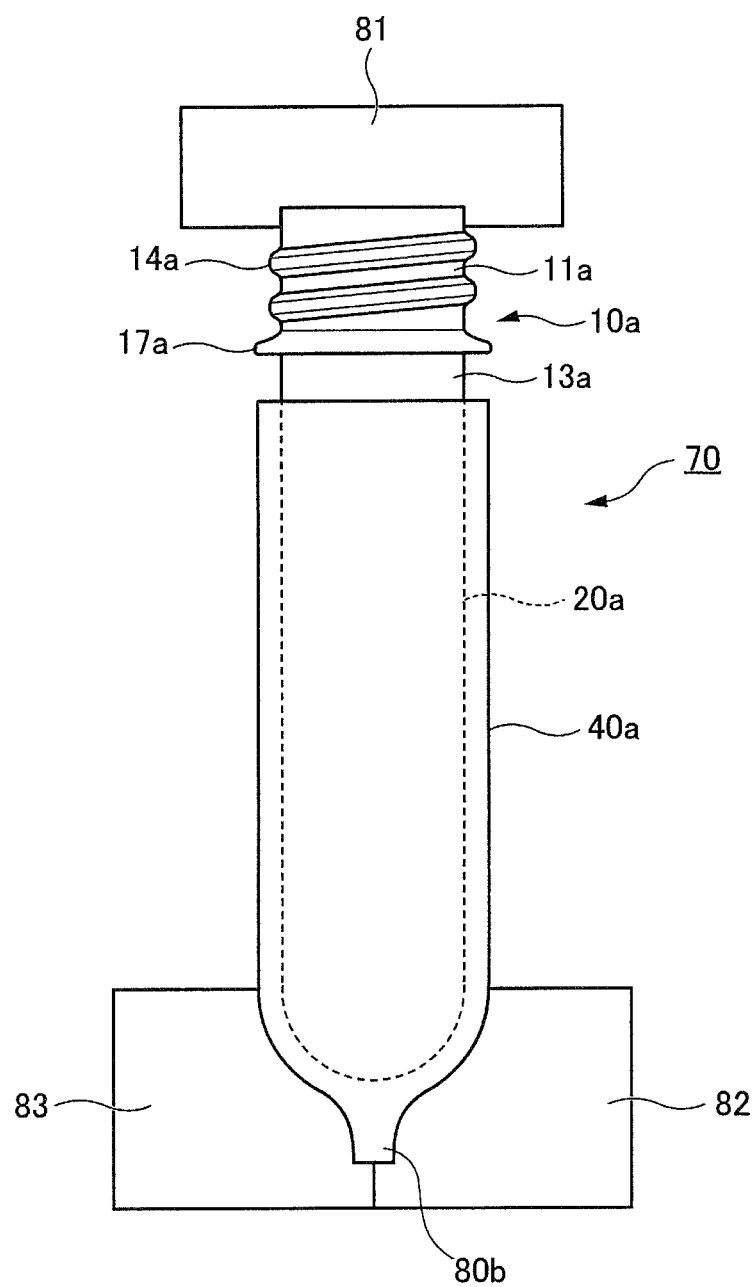
FIG. 20 is a front view illustrating a compression bonding instrument according to the fourth embodiment of the present invention, which has a holding unit and a rotation mechanism and is used for thermocompression-based margin bonding and twist portion formation.

Next, a fourth embodiment of the present invention will be described. FIGS. 19 to 20 are diagrams illustrating the fourth embodiment of the present invention. The fourth embodiment illustrated in FIGS. 19 to 20 differs from the first embodiment in that the plastic member 40a has an end portion where a twist portion 80 is formed, and the other configurations are substantially identical to those of the first embodiment described above. In FIGS. 19 to 20, the same parts as those of the first embodiment illustrated in FIGS. 1 to 10 are denoted by the same reference numerals, and detailed description thereof will be omitted.

Composite Preform 70

FIG. 19 is a diagram illustrating the composite preform 70 according to the present embodiment. As illustrated in FIG. 19, the composite preform 70 according to the present embodiment is provided with the preform 10a formed from a plastic material and the heat shrinkable plastic member 40a, which has a substantially bottomed cylindrical shape and is provided so as to surround the outside of the preform 10a.

The preform 10a is provided with the mouth portion 11a, the body portion 20a connected to the mouth portion 11a, and the bottom portion 30a connected to the body portion 20a. The configuration of the preform 10a is identical to that illustrated in the first embodiment, and detailed description thereof will be omitted here.

In this case, the length of the heat shrinkable plastic member 40a is longer than the lengths of the body portion 20a and the bottom portion 30a of the preform 10a. The margin 80a for thermocompression bonding is formed in the end portion (one end) 40b of the plastic member 40a, which is on the bottom portion 30a side of the preform 10a. This margin 80a is bonded by thermocompression and twisted, and the twist portion 80 is formed as a result.

In the present embodiment, the composite container 10A can be obtained by blow molding of the composite preform 70 illustrated in FIG. 19.

Composite Container 10A

The configuration of the composite container 10A manufactured by means of the composite preform 70 according to the present embodiment is substantially identical to that according to the first embodiment.

Also in the present embodiment, the heat shrinkable plastic member 40 is in close contact with the outer surface of the container main body 10 in a thinly extended state and is attached to the container main body 10 in a state of not moving or rotating with ease. One end of the heat shrinkable plastic member 40 on the bottom portion 30 side of the container main body 10 is compression-bonded to form the compression bonding bottom portion 45A (see FIG. 3). In this case, the heat shrinkable plastic member 40 is compression-bonded at a position covering the bottom portion 30 of the container main body 10. Specifically, thermocompression bonding is performed such that the twist portion 80 (see FIG. 19) of the above-described composite preform 70 is crushed. As a result, the opening 48d (see FIG. 6) of the heat shrinkable plastic member 40a is blocked after blow molding, and the bottom portion 30 is completely covered by the heat shrinkable plastic member 40.

Method for Manufacturing Composite Preform 70

Next, a method for manufacturing the composite preform 70 according to the present embodiment will be described.

The method for manufacturing the composite preform 70 according to the present embodiment includes a step for preparing the preform 10a provided with the mouth portion 11a, the body portion 20a connected to the mouth portion 11a, and the bottom portion 30a connected to the body portion 20a, a step for preparing the tubular heat shrinkable plastic member 40a having the margin 80a for thermocompression bonding at one end, a step for inserting the preform 10a from the other end of the plastic member 40a, a step for performing thermal shrinkage on the plastic member 40a by heating the plastic member 40a, a step for bonding the margin 80a of the plastic member 40a by thermocompression, and a step for forming the twist portion 80 by twisting the margin 80a bonded by thermocompression.

Each step will be described in detail below.

Step for Preparing Preform and Heat Shrinkable Plastic Member

First, the preform 10a and the heat shrinkable plastic member 40a are prepared as in the case of the first embodiment.

The length of the heat shrinkable plastic member 40a is longer than the total length of the body portion 20a and the bottom portion 30a of the preform 10a. The heat shrinkable plastic member 40a has the margin 80a in the end portion (one end) 40b (see FIG. 6). The length of the margin 80a is preferably 3 mm or more and more preferably 5 mm or more and 20 mm or less. By the length of the margin 80a being within the numerical range described above, a thermocompression bonding step and a step for twisting the margin 80a can be performed with greater ease, the material that is used can be reduced, and cost reduction can be achieved.

Insertion Step

Next, the heat shrinkable plastic member 40a open at both ends is inserted into the preform 10a from one end side. At this time, the heat shrinkable plastic member 40a covers the periphery of the body portion 20a and the bottom portion 30a of the preform 10a excluding the mouth portion 11a. In this case, the preform 10a is inserted from the side of the heat shrinkable plastic member 40a that is opposite to the side where the margin 80a is provided.

Thermal Shrinkage Step

Next, the preform 10a and the heat shrinkable plastic member 40a are heated. As a result, the heat shrinkable plastic member 40a undergoes thermal shrinkage and comes into close contact with the outer surface of the preform 10a. The post-thermal shrinkage heat shrinkable plastic member 40a is not adhered to the outer surface of the preform 10a and is in close contact with the preform 10a to the extent of not moving or rotating or to the extent of not falling due to its own weight.

Thermocompression Bonding Step

Next, the end portion (the other end) 40b of the plastic member 40a, which is opposite to the preform 10a-inserted end portion (end portion on the mouth portion 11a side), is bonded by thermocompression. Methods for bonding the margin 80a by thermocompression are not particularly limited, and the thermocompression bonding can be performed by, for example, a method similar to that according to the first embodiment.

Step for Forming Twist Portion 80

Next, the margin 80a bonded by thermocompression is twisted, and then the twist portion 80 illustrated in FIG. 19 is formed. In this manner, it is possible to prevent bubble generation between the plastic member 40 and the container main body 10 of the blow-molded composite container 10A and prevent breakage, such as peeling, of the margin 80a thermocompression-bonded by blow molding. By blow-molding the plastic member 40a in which the twist portion 80 is formed by twisting of the margin 80a, it is possible to obtain the plastic member 40 that is provided with a bottom portion which is decent in appearance.

Methods for forming the twist portion 80 are not particularly limited, and the twist portion 80 can be formed by the margin 80a being manually twisted by means of an instrument such as pliers. In addition, the formation can be mechanically performed by means of, for example, a rotary device (see FIG. 20) including a holding unit 81 holding the preform 10a and the plastic member 40a and compression bonding instruments 82 and 83 having a rotation mechanism. Alternatively, the formation may be performed based on a combination of those methods. Specifically, the twist portion 80 can be formed by the margin 80a being sandwiched by means of an instrument such as pliers and the preform 10a and the plastic member 40a being rotated by a rotation unit.

In one embodiment, the formation of the twist portion 80 can be performed simultaneously with thermocompression bonding of the margin 80a. Then, it is possible to reduce the number of work steps and further improve productivity. Specifically, it is possible to form the twist portion 80 by providing the rotation mechanism in the compression bonding instruments 82 and 83, fixing the preform 10a and the plastic member 40a to the holding unit 81, and rotating the compression bonding instruments 82 and 83. Also, it is possible to form the twist portion 80 by using the compression bonding instruments 82 and 83 as holding units and rotating the preform 10a and the plastic member 40a by means of the rotation unit. The extent to which the margin 80a is twisted is not particularly limited. Although the extent may be approximately 0.25 rotations or more and 30 rotations or less or the twisting may be performed until the margin 80a is twisted off, it is preferable that the twisting is performed until the margin 80a is twisted off so that the appearance can be improved and breakage of the thermocompression-bonded part attributable to blow molding can be prevented more effectively.

Method for Manufacturing Composite Container 10A

The method for manufacturing the composite container 10A according to the present embodiment is substantially identical to that according to the first embodiment. In other words, the method for manufacturing the composite container 10A according to the present embodiment includes a step for heating the composite preform 70 manufactured as described above and inserting the composite preform 70 into a blow molding mold and a step for integrally expanding the preform 10a and the heat shrinkable plastic member 40a by performing blow molding on the composite preform 70 after the heating.

Example

Hereinafter, the present invention will be described in more detail based on examples. The present invention is not limited to the examples.

(Step for Preparing Preform 10a)

The preform 10a that is made of PET and illustrated in FIG. 8 was manufactured by means of an injection molding machine. The weight of this preform 10a was 23.8 g and the length Y of the body portion 20a and the bottom portion 30a of the preform 10a was 90 mm.

(Step for Preparing Heat Shrinkable Plastic Member 40a)

A polyolefin resin was melted and extruded from a ring-shaped die. Next, diameter enlargement was performed by the inner surface of the extruded tube being pressurized or the outer surface of the tube being given a negative pressure from the inner surface, and the heat shrinkable plastic member 40a was manufactured. The length X of the manufactured heat shrinkable plastic member 40a was 100 mm and the length of the margin 80a was 10 mm.

(Insertion Step)

Next, the preform 10a was manually inserted from the end of the heat shrinkable plastic member 40a that is opposite to the margin 80a.

(Thermal Shrinkage and Thermocompression Bonding Steps and Step for Forming Twist Portion 80)

After the insertion, thermal shrinkage was performed on the heat shrinkable plastic member 40a by the preform 10a and the heat shrinkable plastic member 40a being heated to 100° C. by means of an infrared heater.

Next, the preform 10a and the plastic member 40a were fixed to the holding unit 81 illustrated in FIG. 20, and thermocompression bonding was performed by the margin 80a being sandwiched at a pressure of 300 N/cm$^2$ by means of the rotation mechanism-equipped compression bonding instruments 82 and 83 illustrated in FIG. 20 and heated to 100° C. Further, the preform 10a and the plastic member 40a were rotated by the rotation mechanism until the compression-bonded margin 80a was twisted off and the twist portion 80 (see FIG. 19) was formed.

(Composite Container Production)

The composite preform 70 obtained as described above was heated to 100° C. by means of an infrared heater and transported to a blow molding mold. The composite preform 70 was blow-molded in this blow molding mold, and the composite container 10A having a full filling capacity of 500 mL was obtained. In this composite container 10A, the container main body 10 was covered up to the bottom portion of the container main body 10 by the plastic member 40. No bubbles were observed between the container main body 10 and the plastic member 40.

Fifth Embodiment

Next, a fifth embodiment of the present invention will be described. FIGS. 21 to 25 are diagrams illustrating the fifth embodiment of the present invention. The fifth embodiment illustrated in FIGS. 21 to 25 mainly differs from the first embodiment in that a first notch portion 49a and a second notch portion 49b are formed in the plastic member 40a, and the other configurations are substantially identical to those of the first embodiment described above. In FIGS. 21 to 25, the same parts as those of the first embodiment illustrated in FIGS. 1 to 10 are denoted by the same reference numerals, and detailed description thereof will be omitted.

Configuration of Composite Container

The configuration of the composite container 10A according to the present embodiment is substantially identical to that according to the first embodiment (FIGS. 3 and 4). In the present embodiment, the heat shrinkable plastic member 40 is compression-bonded at a position covering the bottom portion 30 of the container main body 10 to form the compression bonding bottom portion 45A. Specifically, thermocompression bonding is performed such that the first piece 47a and the second piece 47b (FIG. 22) of the heat shrinkable plastic member 40a of the composite preform 70, which will be described later, are overlapped with each other. As a result, the opening 48d (FIGS. 21 and 22) of the heat shrinkable plastic member 40a is blocked after blow molding, and the bottom portion 30 is completely covered by the heat shrinkable plastic member 40.

Configuration of Composite Preform

Next, the configuration of the composite preform according to the present embodiment will be described with reference to FIG. 21.

Figure 21:
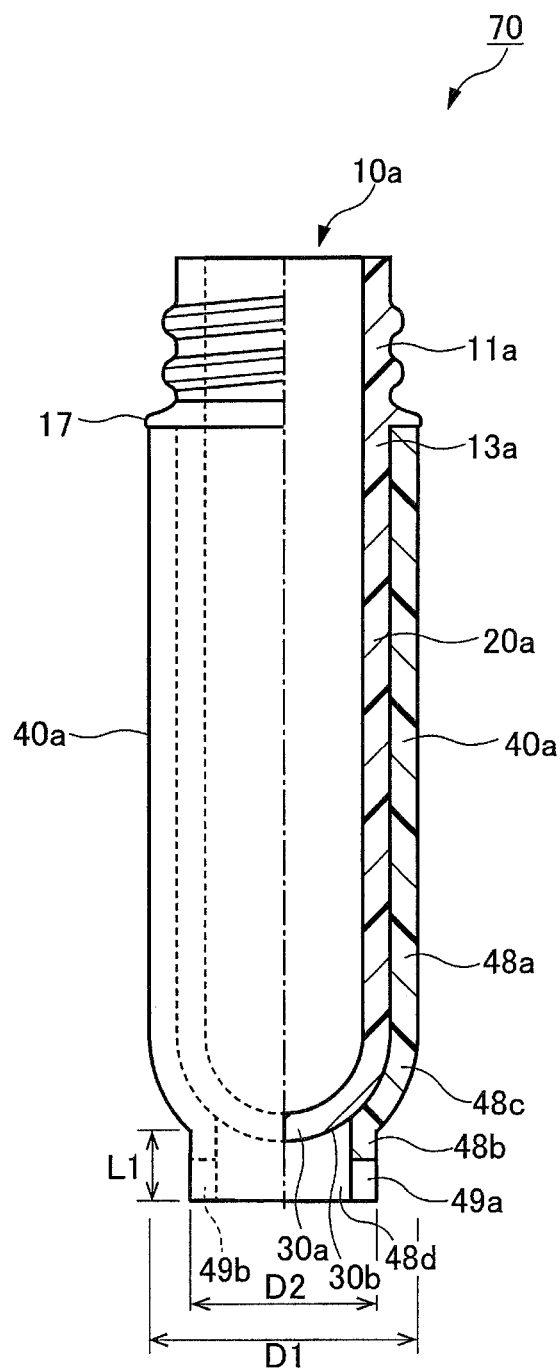
FIG. 21 is a partial vertical cross-sectional view illustrating a composite preform according to a fifth embodiment of the present invention.

As illustrated in FIG. 21, the composite preform 70 is provided with the preform 10a formed from a plastic material and the heat shrinkable plastic member 40a, which has a substantially cylindrical shape and is provided so as to surround the outside of the preform 10a.

The preform 10a is provided with the mouth portion 11a, the body portion 20a connected to the mouth portion 11a, and the bottom portion 30a connected to the body portion 20a. The configuration of the preform 10a is identical to that illustrated in the first embodiment, and detailed description thereof will be omitted here.

The heat shrinkable plastic member 40a is attached, without adhesion, to the outer surface of the preform 10a. The heat shrinkable plastic member 40a is in close contact with the preform 10a to the extent of not moving or rotating or to the extent of not falling due to its own weight. The heat shrinkable plastic member 40a is provided over the entire circumferential region of the preform 10a so as to surround the preform 10a and has a circular horizontal cross section.

In this case, the heat shrinkable plastic member 40a is provided so as to cover the mouth portion 11a and the entire region of the bottom portion 30a excluding a lower surface 30b.

The heat shrinkable plastic member 40a has a large diameter portion 48a and a diameter reduced portion 48b smaller in diameter than the large diameter portion 48a. A transition portion 48c is interposed between the large diameter portion 48a and the diameter reduced portion 48b.

The large diameter portion 48a is substantially cylindrical and covers the entire region of the body portion 20a of the preform 10a. However, the present invention is not limited thereto, and the large diameter portion 48a may cover a part of the body portion 20a such as a region other than the region 13a corresponding to the neck portion 13.

The diameter reduced portion 48b is substantially cylindrical as a whole and extends from the bottom portion 30a of the preform 10a toward the outside (side opposite to the mouth portion 11a). The opening 48d is formed in the region that is surrounded by the diameter reduced portion 48b. The lower surface 30b of the bottom portion 30a is exposed outwards from the opening 48d. In addition, the diameter reduced portion 48b is contraction-formed so as to be smaller in diameter than the large diameter portion 48a by thermal shrinkage of the heat shrinkable plastic member 40a. A length L1 of the diameter reduced portion 48b may be, for example, 30% or more and 100% or less of a diameter D1 of the large diameter portion 48a. A diameter D2 of the diameter reduced portion 48b may be, for example, 30% or more and 90% or less of the diameter D1 of the large diameter portion 48a.

The transition portion 48c is connected to the large diameter portion 48a and the diameter reduced portion 48b. This transition portion 48c is formed along the bottom portion 30a of the preform 10a. In other words, the transition portion 48c corresponds to the shape of the bottom portion 30a, and constitutes a part of a spherical surface in this case. The horizontal cross section of the transition portion 48c is substantially circular with a diameter gradually decreasing from the large diameter portion 48a toward the diameter reduced portion 48b.

Figure 22:
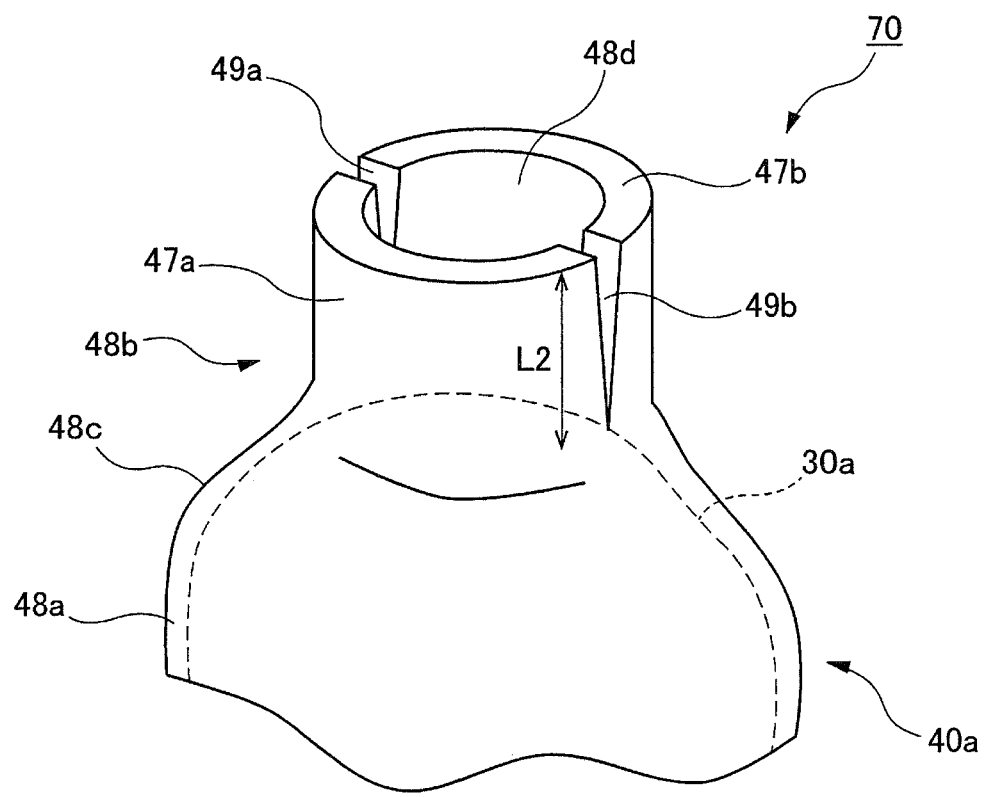
FIG. 22 is a perspective view illustrating the periphery of the bottom portion of the composite preform according to the fifth embodiment of the present invention.

FIG. 22 is a perspective view illustrating the part of the heat shrinkable plastic member 40a that is around the bottom portion 30a. As illustrated in FIG. 22, each of the first notch portion 49a and the second notch portion 49b is formed in the diameter reduced portion 48b. The first notch portion 49a and the second notch portion 49b are provided at positions facing each other in the radial direction of the diameter reduced portion 48b. Each of the first notch portion 49a and the second notch portion 49b is formed in a linear or V shape in the longitudinal direction of the preform 10a along the wall surface of the diameter reduced portion 48b. A length (length along the longitudinal direction of the preform 10a) L2 of the first notch portion 49a and the second notch portion 49b is, for example, 3 mm or more and 20 mm or less. The length L2 is a length that does not reach the bottom portion 30a of the preform 10a.

The diameter reduced portion 48b is provided with the first piece 47a and the second piece 47b separated from each other by the first notch portion 49a and the second notch portion 49b. Each of the first piece 47a and the second piece 47b has a substantially semicircular arc shape when viewed from the bottom surface direction. The first piece 47a and the second piece 47b face each other across the opening 48d.

By the first notch portion 49a and the second notch portion 49b being formed at positions facing each other in the diameter reduced portion 48b as described above, the first piece 47a and the second piece 47b collapse in a direction in which the first piece 47a and the second piece 47b approach each other when the composite preform 70 is blow-molded. As a result, no gap is formed between the heat shrinkable plastic member 40a and the bottom portion 30a of the preform 10a, and thus the heat shrinkable plastic member 40 and the bottom portion 30 of the container main body 10 are substantially uniformly covered after blow molding. Accordingly, the appearance, the light shielding properties, and the gas barrier properties of the heat shrinkable plastic member 40 in the bottom portion 30 are not deteriorated. In addition, it is possible to prevent inconveniences resulting from gap formation between the bottom portion 30 and the heat shrinkable plastic member 40 attributable to air remaining between the heat shrinkable plastic member 40 and the bottom portion 30 of the container main body 10, and deterioration in appearance can be prevented.

Configuration of Heat Shrinkable Plastic Member

Figure 23:
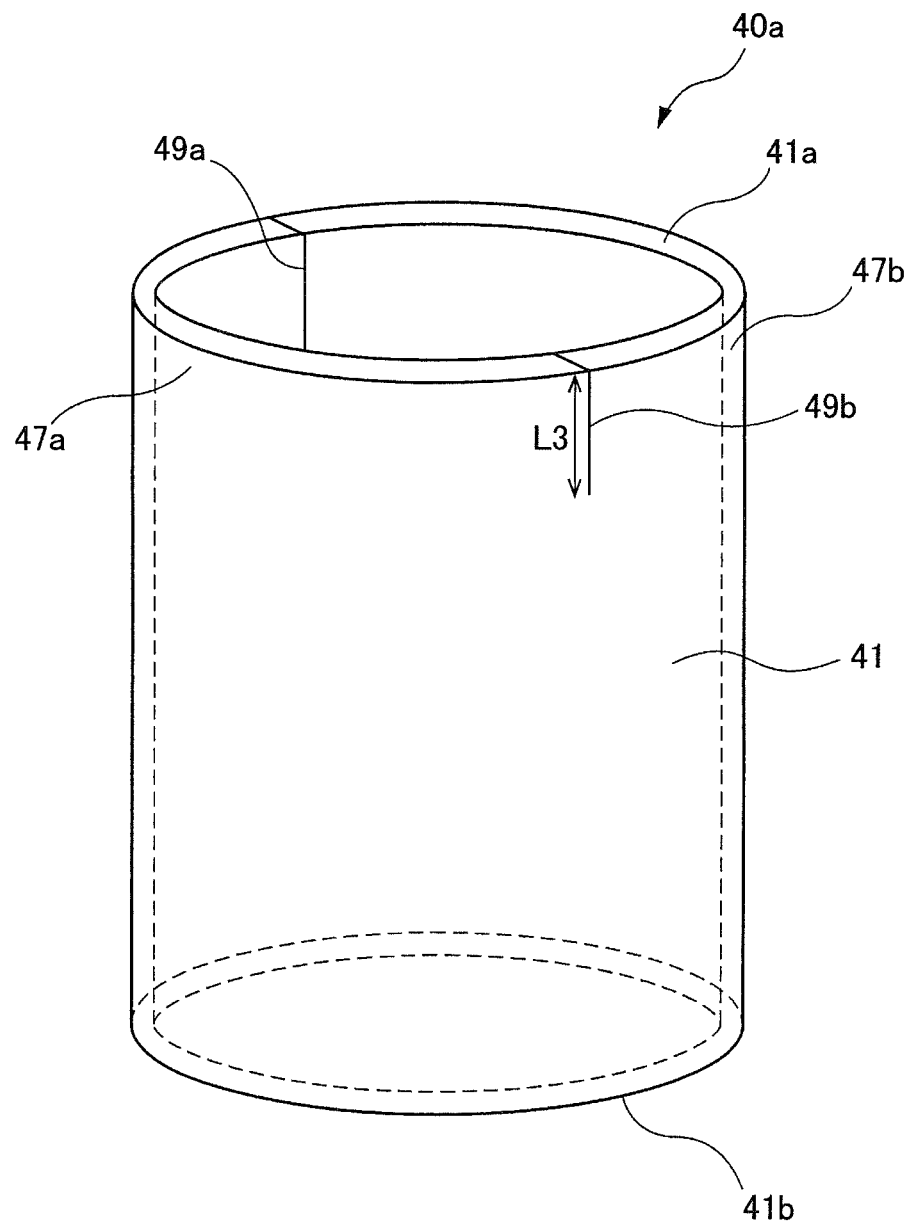
FIG. 23 is a perspective view illustrating a pre-thermal shrinkage heat shrinkable plastic member.
Figure 24:
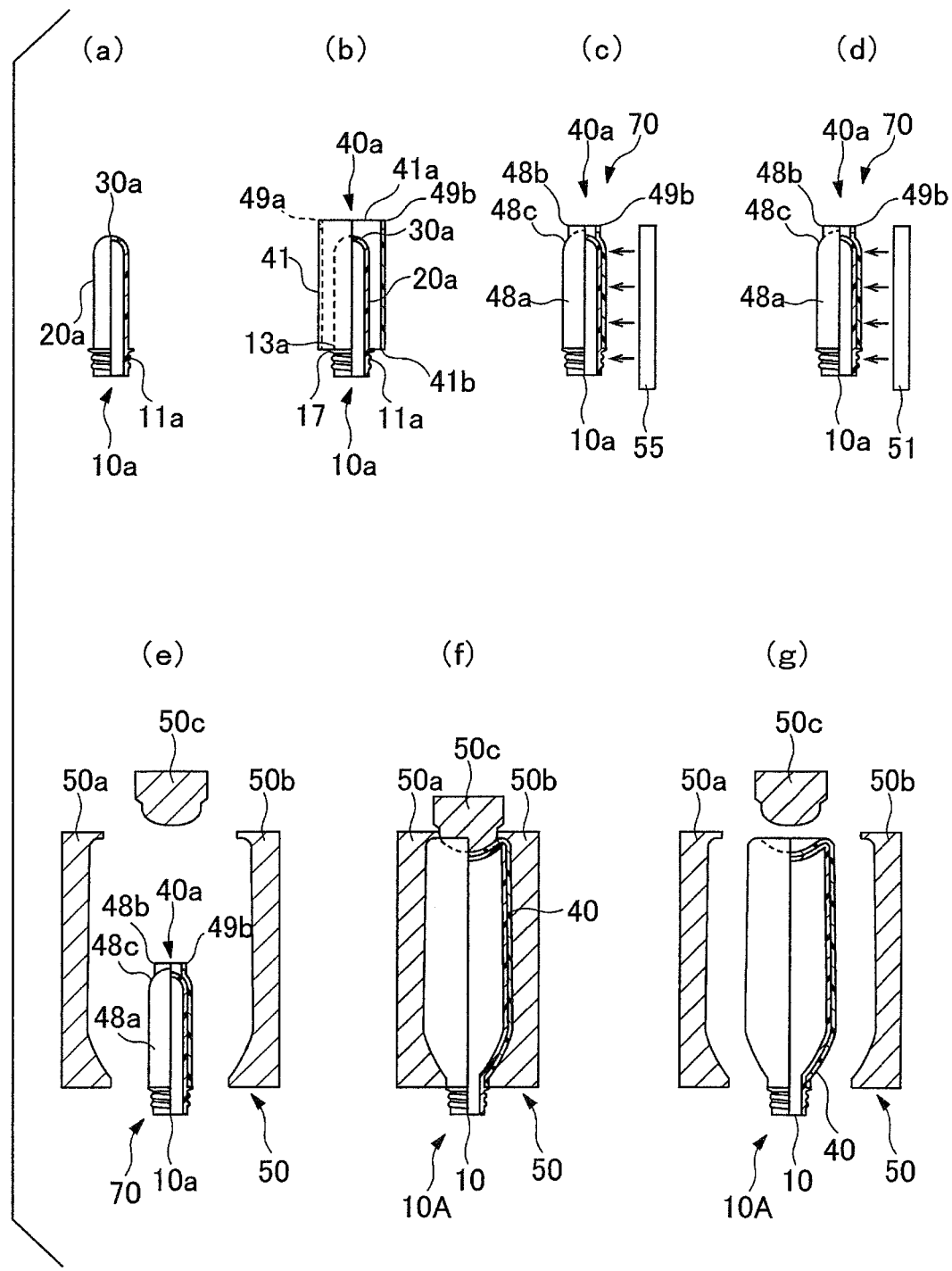
FIGS. 24(a) to 24(g) are schematic diagrams illustrating a composite preform production method and a composite container production method according to the fifth embodiment of the present invention.

FIG. 23 is a perspective view illustrating the heat shrinkable plastic member 40a before thermal shrinkage (before mounting on the preform 10a).

As illustrated in FIG. 23, the heat shrinkable plastic member 40a is substantially cylindrical as a whole and has the body portion 41 and one end 41a and the other end 41b, which are respectively formed at both longitudinal ends of the body portion 41. The one end 41a of the body portion 41 is an end portion facing the mouth portion 11a side when the heat shrinkable plastic member 40a is mounted on the preform 10a, and the other end 41b of the body portion 41 is an end portion facing the bottom portion 30a.

In this case, the first notch portion 49a and the second notch portion 49b are respectively formed at positions facing each other at the one end 41a of the heat shrinkable plastic member 40a. Each of the first notch portion 49a and the second notch portion 49b is linearly formed in the longitudinal direction of the body portion 41, and each of the first notch portion 49a and the second notch portion 49b terminates midway in the longitudinal direction of the body portion 41 from the one end 41a of the body portion 41. In addition, the first piece 47a and the second piece 47b (before thermal shrinkage) separated from each other by the first notch portion 49a and the second notch portion 49b are formed at the one end 41a of the heat shrinkable plastic member 40a. A length L3 of the first notch portion 49a and the second notch portion 49b before thermal shrinkage is, for example, 5 mm or more and 20 mm or less.

One that has a thermal shrinkage action with respect to the preform 10a is used as the heat shrinkable plastic member 40a. In other words, one that contracts with respect to the preform 10a when heat is applied or the like is used as the heat shrinkable plastic member (outside contraction member) 40a.

Method for Manufacturing Composite Preform

Next, a method for manufacturing the composite preform 70 according to the present embodiment will be described with reference to FIGS. 24(a) to 24(c).

First, the preform 10a formed from a plastic material is prepared (see FIG. 24(a)). In this case, the preform 10a is manufactured by an injection molding method and by means of, for example, an injection molding machine (not illustrated). The preform 10a has the mouth portion 11a, the cylindrical body portion 20a, and the substantially hemispherical bottom portion 30a.

Next, the substantially cylindrical heat shrinkable plastic member 40a that has the one end 41a and the other end 41b is prepared (FIG. 23). The first notch portion 49a and the second notch portion 49b are respectively formed at positions facing each other at the one end 41a of this heat shrinkable plastic member 40a.

Subsequently, the heat shrinkable plastic member (outside contraction member) 40a is provided (loosely inserted) outside the preform 10a (see FIG. 24(b)). In this case, the heat shrinkable plastic member 40a is loosely inserted into the preform 10a from the other end 41b side. After loosely inserted into the preform 10a, the heat shrinkable plastic member 40a is mounted so as to cover the entire region of the body portion 20a of the preform 10a and the entire region of the bottom portion 30a as viewed from the side. In addition, the one end 41a of the heat shrinkable plastic member 40a protrudes to the outside (side opposite to the mouth portion 11a) beyond the bottom portion 30a of the preform 10a.

Next, the preform 10a and the heat shrinkable plastic member 40a are heated by means of a heating device 55 (see FIG. 24(c)). At this time, the preform 10a and the heat shrinkable plastic member 40a are uniformly heated in the circumferential direction by the heating device 55 while rotating with the mouth portion 11a facing downwards. The heating temperature of the preform 10a and the heat shrinkable plastic member 40a in this heating step may be, for example, 90° C. to 130° C.

By the heat shrinkable plastic member 40a being heated as described above, the heat shrinkable plastic member 40a undergoes thermal shrinkage and comes into close contact with the outside of the preform 10a (see FIG. 24(c)). At this time, the heat shrinkable plastic member 40a comes into close contact with the preform 10a so as to be along the body portion 20a and the bottom portion 30a and forms the large diameter portion 48a and the transition portion 48c. The part of the heat shrinkable plastic member 40a that protrudes to the outside beyond the bottom portion 30a of the preform 10a contracts radially inwards and becomes the diameter reduced portion 48b. At this time, the first piece 47a and the second piece 47b separated from each other by the first notch portion 49a and the second notch portion 49b are formed in the diameter reduced portion 48b (see FIG. 22).

By the heat shrinkable plastic member 40a being provided outside the preform 10a as described above, the composite preform 70 that has the preform 10a and the heat shrinkable plastic member 40a in close contact with the outside of the preform 10a is obtained (see FIG. 24(c)).

By manufacturing the composite preform 70 with the heat shrinkable plastic member 40a already in close contact with the outside of the preform 10a as described above, it is possible to carry out the sequential steps for manufacturing the composite preform 70 (FIGS. 24(a) to 24(c)) and the sequential steps for performing blow molding-based production of the composite container 10A (FIGS. 24(d) to 24(g)), which will be described later, in different places (such as factories).

Described above as an example is a case where the heat shrinkable plastic member 40a is mounted on the preform 10a with the first notch portion 49a and the second notch portion 49b formed in advance. However, the present invention is not limited thereto. Alternatively, the first notch portion 49a and the second notch portion 49b may be formed after the heat shrinkable plastic member 40a is mounted on the preform 10a.

In this case, the preform 10a is prepared first as in the above-described case. Next, the heat shrinkable plastic member 40a that has neither the first notch portion 49a nor the second notch portion 49b is prepared. Next, the heat shrinkable plastic member 40a is loosely inserted with respect to the preform 10a, and then the heat shrinkable plastic member 40a is brought into close contact with the outside of the preform 10a by thermal shrinkage being performed on the heat shrinkable plastic member 40a. Subsequently, the first notch portion 49a and the second notch portion 49b are respectively formed at positions facing each other at the one end 41a on the open side of the heat shrinkable plastic member 40a. The composite preform 70 is obtained as a result (see FIG. 21).

Method for Manufacturing Composite Container

Next, a method (blow molding method) for manufacturing the composite container 10A according to the present embodiment will be described with reference to FIGS. 24(d) to 24(g).

The composite preform 70 is manufactured through, for example, the above-described steps (see FIGS. 24(a) to 24(c)). Next, the composite preform 70 is heated by the heating device 51 (see FIG. 24(d)). At this time, the composite preform 70 is uniformly heated in the circumferential direction by the heating device 51 while rotating with the mouth portion 11a facing downwards. The heating temperature of the preform 10a and the heat shrinkable plastic member 40a in this heating step may be, for example, 90° C. to 130° C.

Subsequently, the composite preform 70 heated by the heating device 51 is sent to the blow molding mold 50 (see FIG. 24(e)).

The composite container 10A is molded by means of this blow molding mold 50. In this case, the blow molding mold 50 includes the pair of body portion molds 50a and 50b divided from each other and the bottom portion mold 50c (see FIG. 24(e)). In FIG. 24(e), the pair of body portion molds 50a and 50b are open to each other, and the bottom portion mold 50c is raised upwards. In this state, the composite preform 70 is inserted between the pair of body portion molds 50a and 50b.

Next, as illustrated in FIG. 24(f), the pair of body portion molds 50a and 50b are closed after the bottom portion mold 50c is lowered. Then, the blow molding mold 50 that is sealed by the pair of body portion molds 50a and 50b and the bottom portion mold 50c is constituted. Next, air is pressed into the preform 10a and biaxial stretch blow molding is applied to the composite preform 70.

As a result, the container main body 10 is obtained from the preform 10a in the blow molding mold 50. Meanwhile, the body portion molds 50a and 50b are heated to 30° C. to 80° C. and the bottom portion mold 50c is cooled to 5° C. to 25° C. At this time, the heat shrinkable plastic member 40a and the preform 10a of the composite preform 70 are integrally expanded in the blow molding mold 50. As a result, the preform 10a and the heat shrinkable plastic member 40a are integrated into a shape corresponding to the inner surface of the blow molding mold 50.

In this manner, the composite container 10A that is provided with the container main body 10 and the heat shrinkable plastic member 40 provided on the outer surface of the container main body 10 is obtained. At this time, the first piece 47a and the second piece 47b (FIG. 22) formed in the diameter reduced portion 48b of the heat shrinkable plastic member 40a collapse in a direction in which the first piece 47a and the second piece 47b approach each other. As a result, the heat shrinkable plastic member 40a is compression-bonded at a position covering the bottom portion 30 of the container main body 10. At this time, no gap is formed between the heat shrinkable plastic member 40a and the bottom portion 30a of the preform 10a, and thus the appearance of the heat shrinkable plastic member 40 in the bottom portion 30 is not deteriorated with the bottom portion 30 of the container main body 10 covered substantially uniformly by the heat shrinkable plastic member 40. In addition, no air is likely to stagnate between the heat shrinkable plastic member 40 and the bottom portion 30 of the container main body 10, and thus gap formation between the heat shrinkable plastic member 40 and the bottom portion 30 can be prevented.

Next, as illustrated in FIG. 24(g), the pair of body portion molds 50a and 50b and the bottom portion mold 50c are separated from each other, and the composite container 10A is taken out from the inside of the blow molding mold 50.

As described above, according to the present embodiment, the first notch portion 49a and the second notch portion 49b are respectively formed at positions facing each other in the diameter reduced portion 48b of the heat shrinkable plastic member 40a. As a result, the diameter reduced portion 48b is deformed such that the first piece 47a and the second piece 47b are narrowed during blow molding of the composite preform 70, and thus the heat shrinkable plastic member 40 and the bottom portion 30 of the container main body 10 can be in close contact with uniformity after the blow molding and the appearance, the light shielding properties, and the gas barrier properties in the bottom portion 30 can be decent. In addition, it is possible to prevent air from remaining between the heat shrinkable plastic member 40 and the bottom portion 30 of the container main body 10 and to prevent inconveniences related to deterioration in appearance. As a result, the composite container 10A that is given various functions and characteristics such as light shielding properties and gas barrier properties can be manufactured with high quality.

According to the present embodiment, a general blow molding apparatus can be used as it is when the composite container 10A is manufactured, and thus there is no need to prepare a new molding facility for manufacturing the composite container 10A. In addition, since the heat shrinkable plastic member 40a is provided outside the preform 10a, there is no need to prepare a new molding facility for molding the preform 10a.

Modification Example

Figure 25:
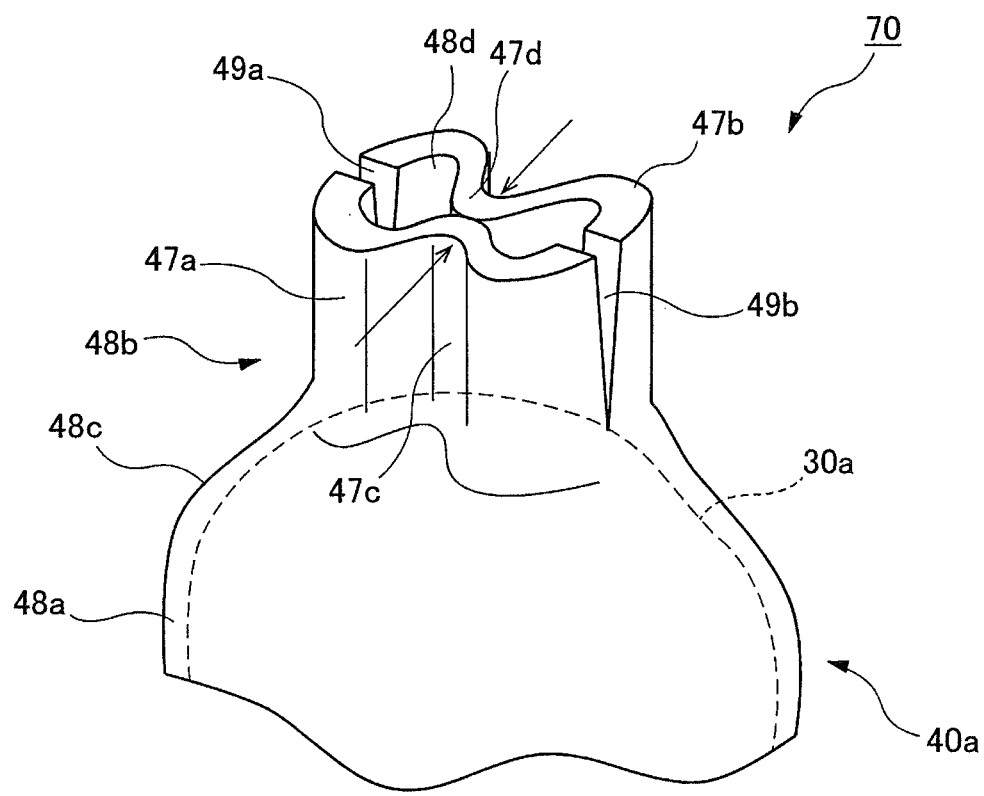
FIG. 25 is a perspective view illustrating the periphery of the bottom portion of a composite preform according to a modification example of the fifth embodiment of the present invention.

Next, a modification example of the composite preform 70 according to the present embodiment will be described with reference to FIG. 25. The modification example illustrated in FIG. 25 is different in that a part of the first piece 47a and a part of the second piece 47b are compression-bonded to each other, and the other configurations are substantially identical to those of the above-described embodiment illustrated in FIGS. 21 to 24. In FIG. 25, the same parts as those illustrated in FIGS. 21 to 24 are denoted by the same reference numerals, and detailed description thereof will be omitted.

As illustrated in FIG. 25, in the composite preform 70, the diameter reduced portion 48b is provided with the first piece 47a and the second piece 47b separated from each other by the first notch portion 49a and the second notch portion 49b.

In this case, a part of the first piece 47a and a part of the second piece 47b are compression-bonded to each other. Specifically, a first compression bonding part 47c having a substantially intermediate position between the first notch portion 49a and the second notch portion 49b in the first piece 47a and a second compression bonding part 47d having a substantially intermediate position between the first notch portion 49a and the second notch portion 49b in the second piece 47b are bonded by thermocompression to each other. As a result, the first compression bonding part 47c and the second compression bonding part 47d are connected to each other, and the first piece 47a and the second piece 47b are integrated. Each of the first piece 47a and the second piece 47b is formed in a w or ω shape when viewed from the bottom surface direction.

In a case where the composite preform 70 described above is manufactured, a step for compression-bonding a part of the first piece 47a and a part of the second piece 47b to each other follows a step for performing thermal shrinkage on the heat shrinkable plastic member 40a (FIG. 24(c)) and precedes a step for heating the composite preform 70 by means of the heating device 51 (FIG. 24(d)). Specifically, the first compression bonding part 47c of the first piece 47a and the second compression bonding part 47d of the second piece 47b are sandwiched inwards, by means of a thermocompression bonding tool (not illustrated) or the like, in a state where the heat shrinkable plastic member 40a has a high temperature immediately after the thermal shrinkage step (FIG. 24(c)), and the first compression bonding part 47c and the second compression bonding part 47d are compression-bonded as a result (see the arrows in FIG. 25). Alternatively, melting and compression bonding may be performed by means of a heated tool (not illustrated) or the like after cooling of the heat shrinkable plastic member 40a. Further, melting and compression bonding may be performed by means of heat generation resulting from ultrasonic vibration of a tool (not illustrated) or the like after cooling of the heat shrinkable plastic member 40a. Conditions (temperature, pressure, and so on) at a time of this compression bonding can be the same as those according to the first embodiment.

As described above, in a case where the composite preform 70 illustrated in FIG. 25 is used, the diameter reduced portion 48b is deformed such that the first piece 47a and the second piece 47b are narrowed during blow molding of the composite preform 70, and thus the heat shrinkable plastic member 40 and the bottom portion 30 of the container main body 10 can be in close contact with uniformity after the blow molding and the appearance in the bottom portion 30 can be decent. At the same time, air is discharged from the opening 48d in the blow molding step, and thus it is possible to more effectively prevent air from remaining between the heat shrinkable plastic member 40 and the bottom portion 30 of the container main body 10. Further, a part of the first piece 47a and a part of the second piece 47b are compression-bonded to each other, and thus the close contact between the heat shrinkable plastic member 40 and the bottom portion 30 of the container main body 10 can be made more reliable, and it is possible to manufacture the composite container 10A that is decent in appearance and excellent in light shielding properties with high quality.

The invention claimed is:

1. A method for manufacturing a composite preform, comprising:
preparing a preform formed from a plastic material and having a mouth portion, a body portion connected to the mouth portion, and a bottom portion connected to the body portion;
preparing a tubular heat shrinkable plastic member longer than the body portion and the bottom portion of the preform and having a margin for thermocompression bonding at one end;
inserting the preform into the plastic member;
having the plastic member undergo thermal shrinkage by heating the preform and the plastic member; and
bonding the margin of the plastic member by thermocompression, wherein one part of the margin is bonded to another part of the margin.

2. The method for manufacturing a composite preform according to claim 1, wherein a first facing surface and a second facing surface disposed so as to face each other are formed at the margin and a part of the first facing surface and a part of the second facing surface are compression-bonded to each other.

3. The method for manufacturing a composite preform according to claim 2, wherein the first facing surface and the second facing surface are compression-bonded in mutual misalignment in an axial direction of the plastic member.

4. The method for manufacturing a composite preform according to claim 1, wherein the margin has a length of 3 mm or more.

5. The method for manufacturing a composite preform according to claim 1, wherein the thermocompression bonding of the margin is performed by means of an instrument having a flat or uneven surface.

6. The method for manufacturing a composite preform according to claim 5, wherein the instrument has a surface temperature of 100° C. or more and 250° C. or less.

7. The method for manufacturing a composite preform according to claim 1, wherein a pressure during the thermocompression bonding of the margin is 50 N/cm2 or more and 1,000 N/cm2 or less.

8. The method for manufacturing a composite preform according to claim 1, wherein the heat shrinkable plastic member has a temperature of 80° C. or more and 200° C. or less during the thermocompression bonding of the margin.

9. A method for manufacturing a composite container, the method comprising:
heating a composite preform obtained by the method according to claim 1; and
inserting the composite preform into a blow molding mold; and
integrally expanding attic preform and the plastic member of the composite preform by blow molding to the composite preform after the heating.

10. A composite preform comprising:
a preform having a mouth portion, a body portion connected to the mouth portion, and a bottom portion connected to the body portion; and
a heat shrinkable plastic member that is longer than the body portion and the bottom portion of the preform, the heat shrinkable plastic member having a margin for thermocompression bonding at one end, and
wherein the plastic member is provided to surround an outside of the preform, and
wherein one part of the margin of the plastic member is bonded to a another part of the margin by thermocompression.

11. The composite preform according to claim 10, wherein a first facing surface and a second facing surface disposed so as to face each other are formed at the margin and a part of the first facing surface and a part of the second facing surface are compression-bonded to each other.

12. The composite preform according to claim 11, wherein the first facing surface and the second facing surface are compression-bonded in mutual misalignment in an axial direction of the plastic member.

13. A composite container comprising a blow molded article of the composite preform according to claim 10, the composite container comprising:
a container main body having a mouth portion, a body portion provided below the mouth portion, and a bottom portion provided below the body portion; and
the heat shrinkable plastic member provided in contact with an outside of the container main body,
wherein one part of the margin of the plastic member is bonded to another part of the margin by thermocompression.

14. A composite preform comprising:
a preform having a mouth portion, a body portion connected to the mouth portion, and a bottom portion connected to the body portion; and
a heat shrinkable plastic member provided to surround an outside of the preform,
wherein an end portion of the plastic member on the bottom portion side of the preform forms a compression bonding bottom portion by being compression-bonded along a shape of the bottom portion of the preform, and
wherein one part of the compression bonding bottom portion is bonded to another part of the compression bonding bottom portion.

15. A composite container comprising a blow molded article of the composite preform according to claim 14, the composite container comprising:
a container main body having a mouth portion, a body portion provided below the mouth portion, and a bottom portion provided below the body portion;
the heat shrinkable plastic member provided in contact with an outside of the container main body,
wherein one end of the plastic member on the bottom portion side of the container main body forms a compression bonding bottom portion by being compression-bonded, and
wherein one part of the compression bonding bottom portion is bonded to another part of the compression bonding bottom portion.

16. A method for manufacturing a composite preform, the method comprising:

preparing a preform having a mouth portion, a body portion connected to the mouth portion, and a bottom portion connected to the body portion;

preparing a tubular heat shrinkable plastic member that is longer than the body portion and the bottom portion of the preform;

inserting the preform into the tubular heat shrinkable plastic member;

heating the preform and the plastic member to cause the plastic member to undergo thermal shrinkage; and forming a compression bonding bottom portion by performing thermocompression bonding on an end portion of the plastic member on the bottom portion side of the preform along a shape of the bottom portion of the preform, wherein one part of the compression bonding bottom portion is bonded to another part of the compression bonding bottom portion.

17. The method for manufacturing a composite preform according to claim 16, wherein the thermocompression bonding is performed by means of an instrument having a flat or uneven surface.

18. The method for manufacturing a composite preform according to claim 17, wherein the instrument has a surface temperature of 100° C. or more and 250° C. or less.

19. The method for manufacturing a composite preform according to claim 16, wherein a pressure during the thermocompression bonding is 50 N/cm2 or more and 1,000 N/cm2 or less.

20. The method for manufacturing a composite preform according to claim 16, wherein the heat shrinkable plastic member has a temperature of 80° C. or more and 200° C. or less during the thermocompression bonding.

21. The method for manufacturing a composite preform according to claim 16, further comprising performing cutting such that a length from a vertex of the bottom portion of the preform to an endmost part of the plastic member is 0.5 mm or more and 5 mm or less.

22. The method for manufacturing a composite preform according to claim 16, wherein a length of the plastic member exceeds a sum of lengths of the body portion and the bottom portion of the preform by 3 mm or more and 25 mm or less.

23. A method for manufacturing a composite preform, the method comprising:

preparing a preform formed from a plastic material and having a mouth portion, a body portion, and a bottom portion;

preparing a tubular heat shrinkable plastic member having one end and the other end, with a first notch portion and a second notch portion respectively formed at positions facing each other at the one end;

loosely inserting the heat shrinkable plastic member into the preform from the other end side; and bringing the heat shrinkable plastic member into close contact with an outside of the preform by having the heat shrinkable plastic member undergo thermal shrinkage.

24. A method for manufacturing a composite preform, the method comprising:

preparing a preform formed from a plastic material and having a mouth portion, a body portion, and a bottom portion;

preparing a heat shrinkable plastic member;

loosely inserting the heat shrinkable plastic member into the preform;

bringing the heat shrinkable plastic member into close contact with an outside of the preform by having the heat shrinkable plastic member undergo thermal shrinkage; and forming a first notch portion and a second notch portion respectively at positions facing each other at one end on an open side of the heat shrinkable plastic member.

25. The method for manufacturing a composite preform according to claim 23, wherein a first piece, and a second piece separated from each other by the first notch portion, and the second notch portion are formed at the one end of the heat shrinkable plastic member, and wherein compression-bonding a part of the first piece and a part of the second piece to each other is provided after the having the heat shrinkable plastic member undergoes thermal shrinkage.

26. The method for manufacturing a composite preform according to claim 25, wherein the compression bonding is performed by means of an instrument having a flat or uneven surface.

27. The method for manufacturing a composite preform according to claim 26, wherein the instrument has a surface temperature of 100° C. or more and 250° C. or less.

28. The method for manufacturing a composite preform according to claim 25, wherein a pressure during the compression bonding is 50 N/cm2 or more and 1,000 N/cm2 or less.

29. The method for manufacturing a composite preform according to claim 25, wherein the heat shrinkable plastic member has a temperature of 80° C. or more and 200° C. or less during the compression bonding.

30. A method for manufacturing a composite container, the method comprising:

manufacturing a composite preform by the composite preform production method according to claim 25; and integrally expanding the preform and the heat shrinkable plastic member by applying blow molding to the heat shrinkable plastic member and the preform of the composite preform.

31. A composite preform comprising:

a preform formed from a plastic material and having a mouth portion, a body portion, and a bottom portion; and a tubular heat shrinkable plastic member provided so as to surround an outside of the preform, wherein the heat shrinkable plastic member has a tubular large diameter portion covering at least the body portion of the preform and a reduced diameter ad portion extending outward from the bottom portion of the preform, the reduced diameter portion having a smaller diameter than the large diameter portion, and a first notch portion and a second notch portion are respectively formed at positions facing each other in the diameter reduced portion.

32. The composite preform according to claim 31, wherein a first piece and a second piece separated from each other by the first notch portion and the second notch portion are formed in the diameter reduced portion and a part of the first piece and a part of the second piece are compression-bonded to each other.

33. A composite container comprising a blow molded article of the composite preform according to claim 31, the composite container comprising:

a container main body having a mouth portion, a body portion, and a bottom portion; and the heat shrinkable plastic member provided in close contact with an outside of the container main body, wherein the heat shrinkable plastic member is compression-bonded at a position covering the bottom portion of the container main body, and wherein one part of the heat shrinkable plastic member is bonded to another part of the heat shrinkable plastic member.

34. A heat shrinkable plastic member mounted so as to surround an outside of a preform, comprising a tubular main body portion having one end and the other end, wherein a first notch portion and a second notch portion are respectively formed at positions facing each other at the one end.

\* \* \* \* \*